United States Patent
Wang et al.

(10) Patent No.: US 11,949,579 B2
(45) Date of Patent: Apr. 2, 2024

(54) METHOD AND DEVICE FOR NETWORK PATH PROBE

(71) Applicant: Beijing QingWang Technology Company Limited., Beijing (CN)

(72) Inventors: Yongdong Wang, Cupertino, CA (US); Guibin Hua, Beijing (CN)

(73) Assignee: AppEx Networks Corporation, Cupertino, CA (US)

( * ) Notice: Subject to any disclaimer, the term of this patent is extended or adjusted under 35 U.S.C. 154(b) by 0 days.

(21) Appl. No.: 17/513,270

(22) Filed: Oct. 28, 2021

(65) Prior Publication Data

US 2022/0131781 A1    Apr. 28, 2022

(30) Foreign Application Priority Data

Oct. 28, 2020   (CN) .......................... 202011171489.0

(51) Int. Cl.
*H04L 43/12*    (2022.01)
(52) U.S. Cl.
CPC .................................... *H04L 43/12* (2013.01)
(58) Field of Classification Search
None
See application file for complete search history.

(56) References Cited

U.S. PATENT DOCUMENTS

| | | | |
|---|---|---|---|
| 8,325,706 B2 * | 12/2012 | Pacella | H04L 45/50 370/395.5 |
| 10,771,379 B2 | 9/2020 | Thomas et al. | |
| 11,296,982 B2 * | 4/2022 | Nainar | H04L 41/0659 |
| 2005/0018647 A1 | 1/2005 | Lebrun et al. | |
| 2007/0268882 A1 * | 11/2007 | Breslau | H04L 43/026 370/346 |
| 2009/0225652 A1 * | 9/2009 | Vasseur | H04L 41/0677 370/225 |
| 2010/0185760 A1 * | 7/2010 | Nakahira | H04L 45/64 709/224 |
| 2016/0037323 A1 * | 2/2016 | Kim | H04W 8/005 370/329 |
| 2021/0320861 A1 * | 10/2021 | Dutta | H04L 45/22 |
| 2022/0200896 A1 | 6/2022 | Zhou et al. | |

FOREIGN PATENT DOCUMENTS

| | | |
|---|---|---|
| CN | 108566336 A | 9/2018 |
| CN | 110995583 A | 4/2020 |
| CN | 111131021 A | 5/2020 |
| CN | 111277498 A | 6/2020 |

* cited by examiner

*Primary Examiner* — Xavier S Wong
(74) *Attorney, Agent, or Firm* — Zhong Law LLC

(57) ABSTRACT

This present disclosure describes path probe methods and devices. The methods comprise receiving a first path probe packet; establishing a first association according to link information in the first path probe packet and a path label of a network path to be probed; determining a third association based on an IP address in the first path probe packet and the path label of the network path to be probed. The IP address includes an IP address of an adjacent network node of the first network node, and a third association includes an association of the path label with the IP address of the adjacent node. The path probe method may reduce system overhead. In the transmission process, the number of network nodes may also be set according to needs. An IP overlay network based on label switching is realized.

18 Claims, 7 Drawing Sheets

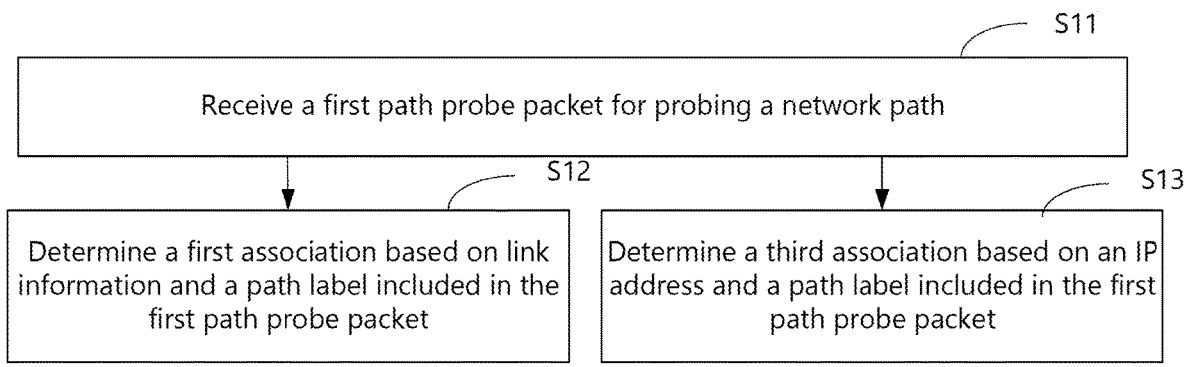
Figure 1
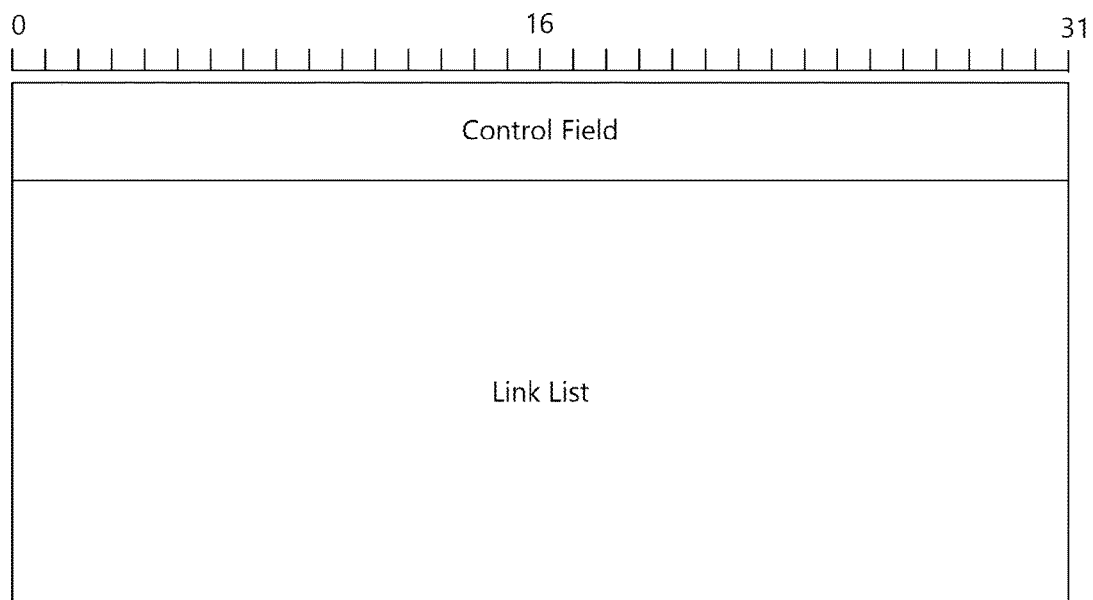
Figure 2
| IPOConn ID | Ctrl field | S2C next hop | C2S next hop |
|---|---|---|---|
|  |  |  |  |
| x |  | Link A | Link B |
|  |  |  |  |
Figure 3

METHOD AND DEVICE FOR NETWORK PATH PROBE

TECHNICAL FIELD

The present disclosure relates to the technical field of communications, and in particular, to a path probe method and device.

BACKGROUND

Information technology has provided a tremendous boost to the development of society as a whole. As society progresses, the demand for resource sharing and optimal utilization of resources is further highlighted. Therefore, information technology gradually enters a cloud based computing era, and the sharing of basic resources represented by cloud storage, cloud computing, cloud services, and cloud transmission becomes a key technical point for the development of the next-generation networks. Cloud networking and cloud transmission technologies provide enterprises and institutions with a set of enterprise network organizations and solutions across the Internet. In the case that the underlying infrastructure of the Internet may not be controlled, tunneling technology becomes one of the key technologies to realize the construction of enterprise WAN across the Internet. However, the related technologies suffer from high system overhead, low transmission quality, and low transmission efficiency when performing packet forwarding.

SUMMARY

The present disclosure relates a path probe method, implemented by a first network node, the method comprising:

Receiving first path probe request and reply packets for path probe;

Establishing a first association based on a link information in a first path probe request packet and a path label of the network path to be probed. A link information is used for identifying a link between a first network node with adjacent network nodes. A first association indicates the relationship between the network path label of the network path to be probed and the link information. A third association is composed of an IP address of the first path probe request packet and the path label of the network path to be probed. The IP addresses comprise the IP addresses of the adjacent network nodes of the first network node. A third association comprises an association of the path label and the IP address of the second network node.

In a possible implementation, the link information in the first path probe packet includes second link information. The second link information is used to identify the link between a source network node of the first path probe packet and the first network node. Establishing the first association according to the link information in the first path probe packet and the path label of the network path to be probed includes establishing an association between the second link information and the path label of the network path to be probed and storing the association at the first network node as the first association.

In a possible implementation, the link information in the first path probe packet includes third link information for identifying the link between the first and a third network node at the next hop of the first network node. Establishing the first association according to the first path probe packet and the path label of the network path to be probed includes establishing an association between the third link information and the path label of the network path to be probed and storing the association at the first network node as the first association.

In a possible implementation, the link information in the first path probe packet includes second link information and third link information. The second link information is used to identify the link between a source network node of the first path probe packet and the first network node. The third link information is used to identify the link between the first network node and a third network node at the next hop of the first network node. Establishing the first association based on the link information in the first path probe packet and the path label of the network path to be probed includes establishing an association between the second link information, the third link information, and the path label of the network path to be probed and storing the association at the first network node as the first association.

In a possible implementation, the IP address described herein comprises the IP address of a source network node of the first path probe packet, and establishing the third association based on the IP address and the path label included in the first path probe packet includes establishing an association between the IP address of the source network node of the first path probe packet and the path label of the network path to be probed, and storing the association at the first network node as the third association.

In a possible implementation, the IP address described herein comprises the IP address of a third network node at the next hop of the first network node, and establishing the third association based on the IP address and the path label included in the first path probe packet includes establishing an association between the IP address of the third network node and the path label of the network path to be probed, and storing the association at the first network node as the third association.

In a possible implementation, the IP address described herein includes the IP address of a source network node of the first path probe packet and the IP address of a third network node at the next hop of the first network node, and establishing the third association based on the IP address and the path label included in the first path probe request packet comprises establishing an association between the IP address of the source network node of the first path request packet, the IP address of the third network node, and the path label of the network path to be probed and storing the association at the first network node as the third association.

In a possible implementation, the method described herein further comprises acquiring the IP address of a third network node at the next hop of the first network node, generating a second path probe packet according to the first path probe packet and the IP address of the third network node, and forwarding the second path probe packet.

In a possible implementation, the method described herein includes acquiring the IP address of a third network node from the first path probe packet; or acquiring the IP address of the third network node based on third link information included in the first path probe packet. The third link information identifies the link between the first and third network nodes.

In a possible implementation, when the first path probe packet is a packet sent from a source network node to a destination network node, the first path probe packet is used to determine the path from the destination network node to the source network node. When the first path probe packet is a path probe reply packet sent from a destination network node to a source network node, the first path probe packet is used to determine the path from the source network node to the destination network node. In this implementation, the path for sending a path probe packet from the source network node to the destination network node is the same as the path for sending a path probe packet from the destination network node to the source network node.

In a possible implementation, when the first path probe packet is a packet sent from a source network node to a destination network node, the first path probe packet is used to determine the path from the source network node to the destination network node. When the first path probe packet is a path probe reply packet sent from a destination network node to a source network node, the first path probe packet is used to determine the path from the destination network node to the source network node. In this implementation, the path for sending a probe request packet from the source network node to the destination network node may be the same as or may be different from the path for sending a probe packet from the destination network node to the source network node.

In a possible implementation, when the first path probe packet is a packet sent from a source network node to a destination network node, the first path probe packet is used to determine a path from the source network node to the destination network node, and a path from the destination network node to the source network node.

In a possible implementation, when the first network node is a destination network node, the method described herein may include:

Generating a path probe reply packet that corresponds to the first path probe request packet, wherein the path probe is completed from the destination network node to a source network node and each network node on the path from the destination network node to the source network node is capable of forwarding a data packet to the source network node along the path. The destination network node is a peer node to the source network node on the network path to be probed, and the source network node is the initiating node of the first path probe packet.

In a possible implementation, the method described herein further comprises generating a path probe reply packet that corresponds to the first path probe packet, wherein the path probe is completed from a source network node to a destination network node, and each network node on the path from the source network node to the destination network node is capable of forwarding a data packet to the destination network node along the path. The destination network node is a peer network node of the source network node on the network path to be probed, and the source network node is the initiating network node of the first path probe packet.

In a possible implementation, when the first network node is a destination network node, the method described herein further comprises generating a path probe reply packet that corresponds to the first path probe packet, wherein the path probe is completed by establishing a path from a source network node to a destination network node and establishing a path from the destination network node to the source network node. Each network node on the path from the source network node to the destination network node is capable of forwarding a data packet bidirectionally. The destination network node is the peer network node of the source network node on the network path to be probed, and the source network node is the initiating network node of the first path probe packet.

In a possible implementation, when the first network node is a source network node and the first path probe packet includes neither an IP address of a third network node nor a next hop, or when there is preset indication information in the first path probe packet, path probe is considered complete. Each network node on the path has the ability to forward data packets bidirectionally. The destination network node is the peer node to the source network node on the network path to be probed, and the source network node is the initiating node of the first path probe packet.

In a possible implementation, when the first network node is a source network node, the method described herein further comprises receiving all link information, IP addresses and path labels associated with the path label of the network path to be probed, and generating the first path probe packet.

In a possible implementation, the method comprises acquiring the IP address of the second network node and determining the first link information based on the path label in the first data packet, wherein the first link information is used for identifying the link between the first network node and the second network node and acquire the IP address of the second network node.

In a possible implementation, the method comprises generating the first link information according to the path label in the first data packet and the first association.

In a possible implementation, the IP address of the second network node is acquired according to the first link information and a pre-established second association.

In a possible implementation, the IP address of the second network node is acquired according to the path label in the first data packet and the third association.

In a possible implementation, generating the second data packet according to the first data packet and the IP address of the second network node includes removing an IP header of the first data packet, obtaining an intermediate data packet, and encapsulating a new IP address header at an outer layer of the intermediate data packet based on the IP address of the second network node to obtain the second data packet.

In a possible implementation, the method described herein further comprises determining that the first network node is a target network node based on a determination that no IP address of the second network node exists or based on a preset indication that the first network node is the target network node.

According to another aspect of the disclosures, a path probe device is provided, which may operate as a first network node, and the device includes:

A first receiving module for receiving the first path probe request packet configured to probe the network path;

A first determination module which is electrically connected to said first receiving module and is used to establish the first association according to the link information in the first path probe request packet and the path label of the network path to be probed The link information identifies a link between the first network node and an adjacent network node. The first association indicates the relationship between the path label of the network path label of the network path to be probed and the link information;

A second determination module which is electrically connected to said first receiving module for determining the third association based on the IP address of the first path probe request packet and the path label of the network path to be probed. The IP address includes the IP addresses of an adjacent network node of the first network node. The third association comprises an association of the path label and the IP address of the second network node.

In a possible implementation, the link information includes the second link information. The second link information is used to identify the link between the source network node of the first path probe request packet and the first network node. Establishing the first association according to the link information in the first path probe packet and the path label of the network path to be probed includes:

Establishing an association between the second link information and the path label of the network path to be probed and storing the association as the first association in the first network node.

In a possible implementation, the link information includes third link information. The third link information is used to identify the link between the first network node and a third network node. The third network node is the next hop of the first network node. Establishing the first association according to the link information in the first path probe packet and the path label of the network path includes:

Establishing an association between the third link information and the path label of the network path to be probed and storing the association as the first association in the first network node.

In a possible implementation, the link information includes second link information and third link information. The second link information is used to identify a link between the source network node of the first path probe request packet and the first network node. The third link information is used to identify the link between the first network node and a third network node. The third network node is the next hop of the first network node. Establishing the first association according to the link information in the first path probe packet and the path label of the network path to be probed includes:

Establishing an association among the second link information, the third link information, and the path label of the network path to be probed and storing the association as the first association in the first network node.

In a possible implementation, the IP address includes the IP address of the source network node of the first path probe packet. Establishing the third association based on the IP address in the first path probe request packet and the path label of the network path to be probed includes:

Acquiring the IP address of the source network node of the first path probe request packet and the path label of the network path to be probed to build the third association and storing the third association in the first network node.

In a possible implementation, the IP address includes the IP address of the third network node, the next hop of the first network node. Establishing the third association according to the IP address in the first path probe request packet and the path label of the network path to be probed includes:

Acquiring the IP address of the third network node and the path label of the network path to be probed to obtain a third association and storing the third association in the first network node.

In a possible implementation, The IP address may include the IP address of the source network node of the first path probe request packet and the IP address of a third network node. The third network node is the next hop of the first network node. Establishing the third association based on the IP address in the first path probe request packet and the path label of the network path to be probed includes:

Establishing an association among the source network node IP of the first path probe request packet, the third network node IP address, and the path label of the network path to be probed and storing the association as the third association in the first network node.

In a possible implementation, the device further includes: A first acquisition module configured to determine the IP address of a third network node and set the third network node as the next hop of the first network node; the first determination module electrically connected to the first acquisition module and configured to generate and forward a second path probe request packet according to the first path probe request packet and the third network node IP address.

In a possible implementation, determining the IP address of the third network node from the first path probe request packet includes:

Determining third link information from the first path probe packet that identifies the link between the first network node and the third network node, and determining the third network node IP address based on the third link information.

In a possible implementation, when the first path probe request packet is a packet from a source network node to a destination network node, the first path probe packet is used to determine the path from the destination network node to the source; when the first path probe packet is sent from a destination network node to a source network node, the first path probe packet is used to determine the path from the source network node to the destination network node. The path for sending the path probe packet from the source to the destination is the same as the path for sending the path probe packet sent from the destination to the source.

In a possible implementation, when the first path probe packet is a packet from a source network node to a destination network node, the first path probe request packet is used to determine the path from the source network node to the destination network node; when the first path probe packet is a path probe reply packet sent from a destination network node to a source network node, the first path probe packet is used to determine the path from the destination to the source. The path for sending the path probe packet from the source network node to the destination network node may be the same as or may be different from the path for sending the path probe packet sent from the destination network node to the source network node.

In a possible implementation, when the first path probe packet is a packet from a source network node to a destination network node, the first path probe packet is used to determine a path from the source network node to the destination network node, and a path from the destination network node to the source network node.

In a possible implementation, when the destination network node is a first network node, the device includes:

Generating a path probe reply packet that corresponds to the first path probe request packet wherein the path probe is completed from a destination network node to a source network node and each network node on the path from the destination to the source is capable of forwarding a data packet to the source along the path. The destination network node is the peer node to the source network node on the path to be probed, and the source network node is the initiating node of the first path probe packet.

In a possible implementation, the path probe is completed by determining a path from a source network node to a destination network node and determining a path from the destination network node to the source network node. Each network node on the path(s) has the ability to forward data packets bidirectionally.

In a possible implementation, when the first network node is a source network node, the path probe device includes:

A fifth determination module configured to determine that path probe is completed and that a data packet is to be received along a path from a source network node to a destination network node based on a determination that the first path probe packet includes neither an IP address of a third network node nor a next hop, or based on a determination that there is preset indication information in the first path probe packet.

In a possible implementation, when the first network node is a source network node, the path probe device includes:

A second generation module connected to the second receiving module and configured to generate the first path probe packet based on link information, IP addresses, and path labels associated with the path to be probed.

In a possible implementation, the device includes a first determination module for receiving the first data packet and acquiring the IP address of the second network node according to the path label in the first data packet; a third generation module electrically connected to a third receiving module to generate and forward a second data packet according to a first data packet and the IP address of a second network node.

In a possible implementation, the method includes acquiring an IP address of a second network node and establishing a first link information based on the path label in the first data packet, wherein a first link information identifies the link between a first network node and the second network node and acquires the IP address of the second network node.

In a possible implementation, the method comprises generating a first link information based on a path label in the first data packet and a first association.

In a possible implementation, an IP address of the second network node is acquired according to a first link information and a pre-established second association.

In a possible implementation, an IP address of the second network node is acquired according to a path label in a first data packet and a third association.

In a possible implementation, generating the second data packet according to the first data packet and the IP address of the second network node includes removing an IP header of the first data packet, obtaining an intermediate data packet and encapsulating a new IP address header at an outer layer of the intermediate data packet based on the IP address of the second network node to obtain the second data packet.

In a possible implementation, the device includes a third determination module which is used for determining a target network node based on a determination that the first path probe packet includes no IP address of the second network node or that the first path probe packet includes a preset indication that the device is the target network node.

According to an aspect of the disclosure, the path probe device includes: One or more processors; Memory configured to store executable instructions; Wherein, the one or more processors are configured to: Implement the path probe methods described herein.

Another aspect of the present disclosure includes a non-volatile computer-readable storage medium configured to store computer program instructions that, when executed by one or more processors, implement the methods described herein.

By the above method, the present disclosure may establish the first association based on the second link information in the first path probe request packet and the path label of the network path to be probed, or the third association based on the IP address in the first path probe request packet and the path label of the network path to be probed, so as to establish a path from the first network node to the source network node. The path probe method in the implementation of the present disclosure reduces system overhead. In the transmission process, the number of network nodes may also be set according to the need to provide room for expansion. An IP overlay mechanism based on label switching may be used for data transmission, which may reduce costs, enable sharing of transmission resources and allow for integration of resources across operators, cloud service providers and other types of network service providers.

A detailed description of example implementations will be provided in the following section in combination with the attached figures to further illustrate the characteristics and aspects of the present disclosure.

DESCRIPTION OF FIGURES

The attached figures in the instructions show the examples, characteristics of this disclosure, and are used to explain the principle of this disclosure.

FIG. 1 is a flowchart illustrating an example of a path probe method in accordance with one or more embodiments described herein.

FIG. 2 is a schematic diagram illustrating an example of a path probe method in accordance with one or more embodiments described herein.

FIG. 3 is a flowchart illustrating an example of an association in the path probe method in accordance with one or more embodiments described herein.

DETAILED DESCRIPTION

Figure 4:
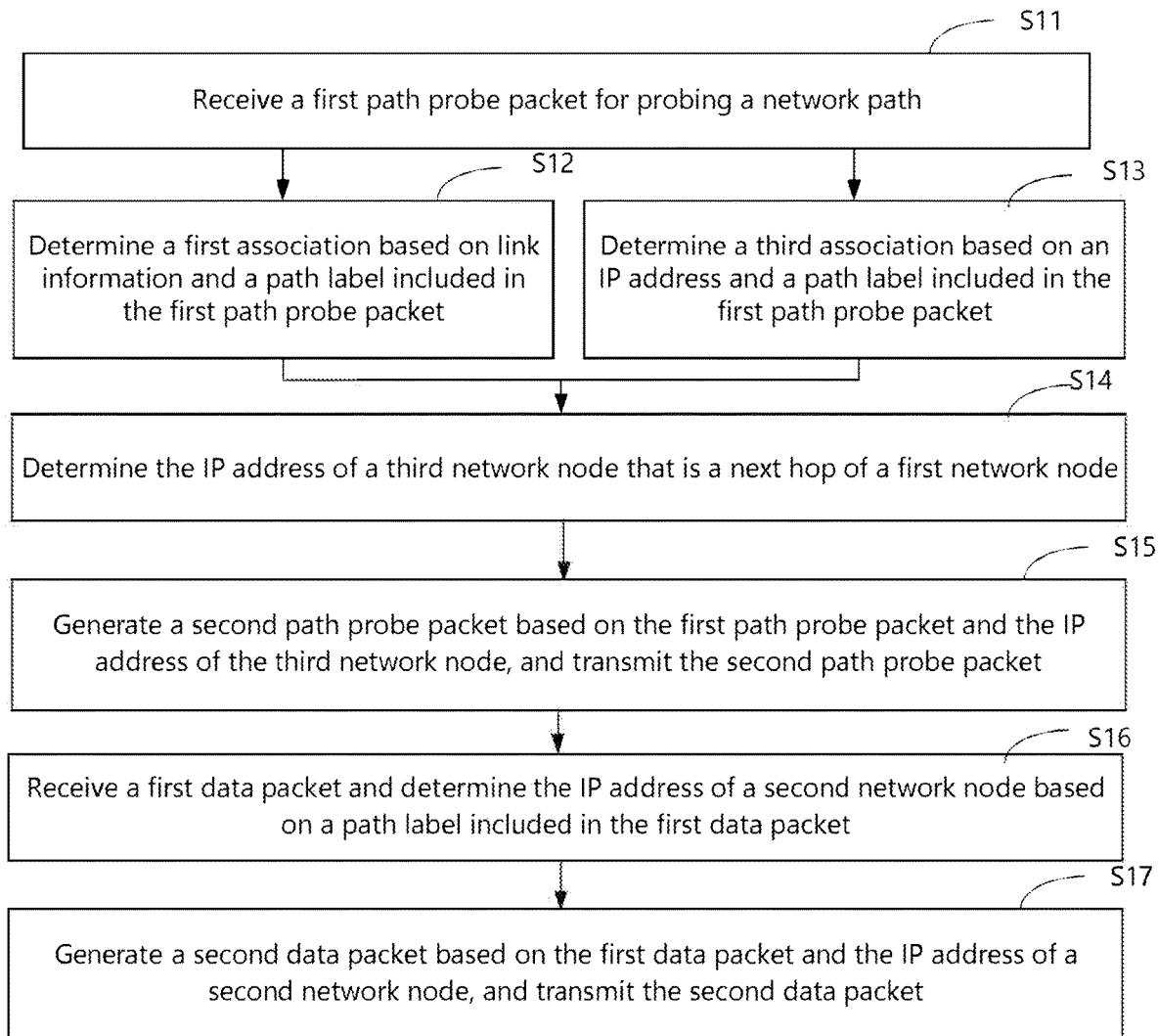
FIG. 4 is a flowchart illustrating an example of a path probe method in accordance with one or more embodiments described herein.

Various exemplary implementations and features of this disclosure will be described in detail with reference to the attached figures.

The same attached markers in the attached figure represent elements with identical or similar functions.

Various implementation examples are shown in the attached figure, which may not show the examples in real proportions unless specifically pointed out.

The word "exemplary" used here may mean "an example," "an embodiment," or "an illustration." Any examples described here as "exemplary" should not be interpreted as being superior to or better than other examples.

In addition, to better explain this disclosure, specific details are given in the following examples. It should be understood by those skilled in the art that the disclosed techniques may be implemented without the specific details. In some examples, to more clearly illustrate an inventive concept, methods, means, components, and circuits that are known to those skilled in the art are not described with every detail.

Tunneling techniques in related technologies, such as Internet Protocol Security (IPsec), Generic Routing Encapsulation (GRE), Virtual extensible Local Area Network (VxLAN), Layer Two Tunneling Protocol (L2TP), etc., focus on end-to-end connections, and have no control over the transit network nodes of a tunnel. Nor do these techniques control the transmission quality of the tunnel. Consequently, these techniques may not provide value-added services to users, and may only be regarded as an early prototype of cloud networking.

In related technologies, IP routing protocols, which serve as the basic protocols of the Internet, are designed to provide source routing options and support the selection of transit network nodes, but their shortcomings are also quite obvious: first, these protocols require each packet to carry source routing options, which in effect increases system overhead; second, limited by the length of IP packet headers, the number of intermediate source routing network nodes that may be set is also limited and may not be increased; third, the source routing technology itself does not include the selection of transit network nodes, and still needs to cooperate with other protocols to complete path probe and routing selection.

In related technologies, MPLS (Multiprotocol Label Switching), which uses label switching technologies, may not fully realize the sharing of resources due to high costs, as well as requirements for physical lines and equipment, interoperability with the Internet, and the exclusivity of users.

Given the above-mentioned problems in the related technologies, the present disclosure proposes a path probe method to improve transmission quality and efficiency, reduce system overhead, and exercise control over intermediate transit network nodes.

FIG. 1 includes a flowchart illustrating an example of a path probe method.

As FIG. 1 shows, the path probe method implemented by the first network node comprises:

In step S11, receiving the first path probe request packet for path probe; In step S12, a first association is established according to the link information in the first path probe request packet and the path label of the network path to be probed. The link information identifies a link between the first network node and an adjacent network node. The first association indicates an association between the path label and the link information.

In step S13, a third association is established according to the IP address in the first path probe request packet and the path label of the network path to be probed. The IP address includes the IP address of an adjacent network node of the first network node, and the third association indicates an association between the path label and the IP address of the second network node.

By the above method, the present disclosure may establish a first association based on a second link information in the first path probe request packet and the path label of the network path to be probed, or a third association based on the IP address in the first path probe request packet and the path label of the network path to be probed, so as to establish a path from the first network node to the source network node. The path probe method in the implementation of the present disclosure reduces system overhead. In the transmission process, the number of network nodes may also be set according to the need to provide room for expansion. An IP overlay mechanism based on label switching may be used for data transmission and may reduce costs, enable sharing of transmission resources, and allow for integration of resources across operators, cloud service providers and other types of network service providers.

In a possible implementation, the transmission path to be probed using the path probe request packet may include a source network node, at least one transit network node, and a destination network node, and the first network node described herein may be a source network node, any transit network node, or a destination network node. The destination network node is the peer network node to the source network node on the network path to be probed, and the source network node is the initiating network node of the first path probe request packet.

In an example, source and destination network nodes may be client terminal devices deployed at respective user network access points (e.g., entry and exit points), and may serve as gateways between an intranet (e.g., LAN) and an extranet (e.g., the Internet), or as the starting and ending network nodes of a transmission path (e.g., a tunnel).

The client terminal device may be, for example, a terminal, which may also be referred to as user equipment (UE), a mobile station (MS), a mobile terminal (MT), etc., which may be a device that provides voice and/or data connectivity to a user. Such a terminal may be, for instance, a handheld device with wireless connectivity, a vehicle-mounted device, etc. At present, example terminals include mobile phones, tablet computers, laptop computers, handheld computers, mobile internet devices (MID), wearable equipment, virtual reality (VR) equipment, augmented reality (AR) equipment, wireless terminals in industrial control, wireless terminals in self-driving, wireless terminals in a remote medical surgery, wireless terminals in a smart grid, wireless terminals used for transportation safety, wireless terminals in a smart city, wireless terminals in a smart home, wireless terminals for vehicular networking, and cloud hosts in public or private cloud networks.

Of course, the above description is illustrative. The source network node and the destination network node may also be any other device that may send and receive data packets. Implementations of the present disclosure are not limited to any specific type of devices.

Each network node on the transmission path may generate a data packet from the initial network node to the destination network node.

In examples, an intermediate network node may also be referred to as a transit network node, which may be a network node on a transmission path for packet transit services. Such an intermediate network node may also be referred to as an IP source routing network node.

In examples, a transit network node may include a network device with network transmission capabilities, such as a router and switch.

In examples, a transit network node may include a cloud host in a public or private cloud network.

In examples, a transit network node may also be a base station (BS), which may also be referred to as a base station device, which may be a device deployed in a wireless access network to provide wireless communication.

For example, the devices that provide base station functions in 2G networks include a base transceiver station (BTS) and a base station controller (BSC), the devices that provide base station functions in 3G networks include a network node B and a wireless network controller (RNC), the devices that provide base station functions in 4G networks include an evolved network node B (eNB), the devices that provide base station functions in wireless local area networks (WLAN) include an access point (AP), the devices that provide base station functions in 5G new radio (NR) include a gNB, and the devices may also include a device that provides base station functions in future new communication systems.

The above description of transit network nodes is illustrative and should not be regarded as a restriction.

It should be noted that the present disclosure does not limit the number of transit network nodes in a transmission path, which may be set by those skilled in the art as needed.

In a possible implementation, IP addresses may support multiple versions, including but not limited to IPv4, IPv6, and other possible subsequent versions of IP protocols.

In a possible implementation, IP addresses may also include other network protocol addresses such as UDP addresses, TCP addresses, /IPIP/GRE/VxLan addresses, RAW IP addresses, etc. The present disclosure is not limited to any specific type of network address.

In examples, a network protocol address may be a UDP address, which may be used to illustrate the embodiments provided in this disclosure.

In an example, a transmission path may refer to a path for data packet transmission in a transmission system comprising a source network node, a transit network node, and a destination network node. A link according to the link information described herein may be part of the transmission path, i.e., the transmission path may be considered as including multiple links.

In an example, a link according to the link information described herein may be a virtual link between two adjacent network nodes on the transmission path, and two network nodes associated with a link are neighbors to each other.

In an example, the link information described herein includes link identification information (LinkID) by which the link information may be uniquely identified. For example, 3 bytes may be for an LinkID, which may support a maximum of 16M links.

The above description is illustrative and the third link information may include the identification of a next-hop network node, a MAC address, or other information that may uniquely identify the next-hop network node.

The following is an exemplary description of the path probe request packet.

FIG. 2 includes a diagram illustrating an example of a path probe request packet.

In the example shown in FIG. 2, the path probe request packet may include, for example, 32 bits, which may carry control fields and a list of link information (or a list of IP address information), etc. The control fields may include multiple fields such as a packet type (or packet command) field.

In an example, the link information list may include link information for all links after a current link.

In an example, the list of link information in the first path probe packet may be arranged in order. The first link information in the list may be the link information between the first network node and the next-hop network node, and the second link information may be the link information of the second network node and the next-hop network node. Therefore, the first link information in the link information list may be obtained as the third link information. Such link information may be popped out of the list to ensure that the first link information obtained subsequently from the list is the link information between the current network node and the next-hop network node.

Of course, the above description of the path probe packet is illustrative and should not be considered as a limitation to the present disclosure.

In examples, when the first network node is the source network node, the path labels in the path probe request packet and link information may be sent by the orchestrator device, which may be used to be responsible for managing and maintaining the entire network information, using centralized control to unify the management and provisioning of end network nodes (source network nodes, destination network nodes), transit network nodes, and link information between each network node, etc.

In a possible implementation, an orchestrator device may be implemented using a controller with the ability to execute instructions. The controller may include, for example, a microprocessor, a central processing unit (CPU), a control logic portion of a memory controller, and other implementations, including but not limited to chips of the following models: ARC 625D, Atmel AT91SAM, Microchip PIC18F26K20, and the Silicon Labs C8051F320. Within processor 101, instructions may be executed by hardware circuitry such as logic gates, switches, Application-Specific Integrated Circuits (ASICs), programmable logic controllers, and embedded microcontrollers.

The orchestrator device may also be implemented with dedicated hardware circuitry, to which the present disclosure imposes no restrictions.

FIG. 3 is a diagram illustrating a first association in the path probe method as described herein.

In a possible implementation, as shown in FIG. 3, the first association may be stored in the form of a table, which may be referred to as a label switch table. Of course, in other implementations, the first association may also be in other forms, to which the present disclosure imposes no restrictions.

In one example, as shown in FIG. 3, the first association may include an association of a path label or identifier (IPOConn ID) with the first link information.

In an example, as shown in FIG. 3, the first link information may include at least two types depending on the transmission direction of the first data packet. For example, when the first data packet is sent from a source network node to a destination network node, the first link information may be identified, based on the path label x, as Link B (C2S next hop, i.e., a next-hop node on the path from the source network node (C, client) to the destination network node (S, server)). When the first data packet is sent back from the destination network node to the source network node, the first link information may be determined, based on the path label x, as Link A (S2C next hop, i.e., the next-hop network node on the path from the destination network node to the source network node).

In an example, the first association may also include other information. For example, as shown in FIG. 3, the first association may also include a control field Ctrl. In an example, different control information may be set for different path labels and written to the Ctrl field, and when the first network node receives the first data packet, it may determine the corresponding control information according to the path label x.

Of course, the present disclosure imposes no restrictions on the type and specific content of the control information, and those skilled in the art may set it as needed.

Through the above method, embodiments of the present disclosure may establish the first association of each network node in a transmission path, and store the first association in each network node, and each network node may maintain, modify, and inspect the stored first association.

The following is a description of possible implementations of each step of the path probe method.

In a possible implementation, the link information includes the second link information. The second link information is used to identify the link between the source network node of the first path probe request packet and the first network node. Step S12 for establishing the first association based on the link information in the first path probe request packet and the path label of the network path to be probed may include:

Establishing an association between the second link information and the path label of the network path to be probed; and Storing the association as the first association at the first network node. In an example, the first network node may write the path label to the IPOConn ID field of the aforementioned first association and write the second link information to the corresponding next-hop field (e.g., S2C next hop or C2S next hop). As such, the first association may be established based on the association of the second link information with the path label of the network path to be probed.

In a possible implementation, when the first path probe packet is a path probe request packet from a source network node to a destination network node, the first path probe packet is used to establish a path from the destination network node to the source.

In this case, the path label of the network path to be probed may be written to the IPOConn ID field of the first association and the second link information may be written to the S2C next hop field to obtain the path from the first network node to the source network node of the first path probe packet.

In an example, when a packet needs to be forwarded from the first network node to the source network node of the path probe request packet needs to be forwarded, the first network node may acquire the second link information in the C2S next-hop field domain from the first association based on the path label, and acquiring the IP address of the source network node of the path probe request packet based on the second link information and the second association to enable forwarding of the packet.

When the first path probe request packet is the path probe reply packet sent from a source network node to a destination network node, the first path probe request packet is used to establish a path from the source to the destination.

In this case, the path label of the network path to be probed may be written to the IPOConn ID field of the first association and the second link information may be written to the C2S next hop field to obtain a path from the first network node to a third network node (in the direction pointing from the source network node to the destination network node).

In a possible implementation, the path from the destination network node to the source network node is established using the path probe request packet from the source network node to the destination network node direction, and the path from the source network node to the destination network node is established using the path probe request packet from the destination network node to the source network node direction. The path along which the path probe request packet travels from the source network node to the destination network node is the same as the path along which the path probe reply packet travels from the destination network node to the source network node In an example, when a packet from the first network node to the third network node needs to be forwarded, the first network node may obtain the second link information in the C2S next-hop field from the first association based on the path label, and acquire the IP address of the third network node based on the second link information and the second association to enable forwarding of the packet.

In a possible implementation, when the first network node is a destination network node, the methods described herein include:

Generating a path probe reply packet that corresponds to the first path probe request packet; and Completing the path probe from the destination network node to the source network node, wherein each network node on the path is capable of forwarding a data packet along the path to the source network node.

In this case, the destination network node is the peer network node of the source network node on the path to be probed, and the source network node is the initiating network node of the first path probe request packet.

In an example, the path from the destination network node to the source network node is established when a path probe request packet sent from the source network node arrives at the destination network node. In this case, the destination network node may generate a path probe reply packet and send the path probe reply packet to probe a path from the source network node to the destination network node. Each network node may forward data packets from the destination network node to the source network node.

It should be understood that "forwarding" in various embodiments of the present disclosure may refer to forwarding a data packet from a previous network node to a next network node (e.g., a transit network node forwards data packets from a destination network node to a source network node), or "forwarding" may refer to the generation of a data packet by any network node and the forwarding of the data packet to a next network node. Thus, each network node in the embodiment of the present disclosure may generate data packets and forward data packets.

In an example, the path establishment from the source network node to the destination network node is completed when a path probe packet (which may be a path probe reply packet that corresponds to a path probe request packet from the source network node to the destination network node) arrives at the source network node from the destination network node. In this case, a bidirectional path is established and each network node on the path may forward data packets along the path in any direction. For example, a source network node may generate and forward data packets to a destination network node or any other transit network nodes.

Through the above method, the embodiments of the present disclosure may establish a first association between second link information and a path label to improve the efficiency and quality of subsequent packet forwarding. Moreover, embodiments of the present disclosure establish a path from a destination network node to a source network node using a path probe request packet sent from the source network node to the destination network node, and establish a path from the source network node to the destination network node using a path probe reply packet sent from the destination network node to the source network node. This technique may improve the efficiency of path creation and may quickly establish a first association at each network node. Further, the technique may utilize an established transmission path to forward packets. When a transmission path failure results in breach of a service-level agreement (SLA), dynamic path switching may be performed, and packets may still be transmitted during path switching. This may lead to seamless path switching, which improves the efficiency and quality of packet transmission.

In a possible implementation, the IP address described herein includes the IP address of the source network node of the first path probe packet. Step S13 for establishing the third association based on the IP address included in the first path probe packet and the path label of the network path to be probed may include:

Establishing an association between the IP address of the source network node of the first path probe request packet and the path label of the network path as the third association; and Storing the third association at the first network node.

In an example, the first network node may write the path label to the IPOConn ID field of the first association and write the IP address of the source network node to the corresponding next-hop field (e.g., S2C next hop or C2S next hop). This way, an association between the IP address of the source network node and the path label of the network path to be probed may be obtained as third association.

It should be noted that the process of establishing the third association based on the IP address and path label is similar to the process of establishing the first association based on link information and a path label. So, the process is not described again herein.

Of course, the embodiments of the present disclosure may also use the first association and the pre-established second association to obtain the third association after the first association is established using the aforementioned method. For this, the present disclosure imposes no restrictions.

It should be noted that the above has introduced an example of establishing a backward path using a path probe request packet transmitted in a forward direction, and an example of establishing a forward path using a path probe reply packet in a backward direction. However, the scope of the present disclosure is not limited to these examples. In other embodiments, a forward-path probe packet may be used to establish a forward path, and a backward-path probe packet may be used to establish a backward path. A forward-path probe packet may also be used to establish a forward path and a backward path.

In a possible implementation, third link information is used to identify a link between a first network node and a third network node, wherein the third network node is the next hop of the first network node. Step S12 for establishing the first association based on link information included in the first path probe packet and the path label of the network path to be probed may include:

Establishing an association between the third link information and the path label of the network path to be probe as the first association; and Storing the first association at the first network node.

In an example, the first network node may write the path label to the IPOConn ID field of the first association and write the third link information to the corresponding next-hop field (e.g., S2C next hop or C2S next hop). This way, the first association may be established based on the association between the second link information and the path label of the network path to be probed.

In a possible implementation, the IP address comprises the IP address of the third network node, which is the next-hop network node of the first network node. Step S13 for establishing the third association based on the IP address in the first path probe request packet and the path label of the network path to be probed may comprise:

Establishing an association between the IP address of the third network node and the path label of the network path to be probed as the third association; and Storing the third association at the first network node.

In an example, the first network node may write the path label to the IPOConn ID field of the first association and write the IP address of the source network node to the corresponding next-hop field (e.g., S2C next hop or C2S next hop). This way, the association between the IP address of the source network node and the path label of the network path to be probed may be obtained as the third association.

In a possible implementation, a first path probe packet is used to determine a path from a source network node to a destination network node if the first path probe packet is sent from the source network node to the destination network node; or the first path probe packet is used to determine a path from a destination network node to a source network node if the first path probe packet is a path probe reply packet sent from the destination network node to the source network node.

In this implementation, the path along which the path probe packet travels from the source network node to the destination network node may be the same as or may be different from the path along which the path probe reply packet travels from the destination network node to the source network node.

In a possible implementation, the path probe method described herein include:

Generating a path probe reply packet that corresponds to a first path probe request packet.

When path probe from a source network node to a destination network node is completed, each network node on the path is capable of forwarding a data packet along the path to the destination network node.

In this implementation, the destination network node is the peer network node to the source network node on the path to be probed, and the source network node is the initiator of the first path probe request packet.

In an example, a path from a source network node to a destination network node is completed when a path probe request packet arrives at the destination network node from the source network node. In this case, the destination network node may generate and sent a path probe reply packet for probing a path from the destination network node to the source network node. Each network node may forward data packets from the source network node to the destination network node. For example, the source network node may generate and forward data packets to the destination network node or to other transit network nodes.

In an example, a path from a destination network node to a source network node is completed when a path probe packet (which may be a path probe reply packet that corresponds to a path probe request packet sent from the source network node to the destination network node) arrives at the source network node from the destination network node. In this case, a bidirectional path is established, and each network node on the path may forward data packets in any direction. For example, each network node may forward data packets in the direction of the path from the destination network node to the source network node.

Using the techniques described above, embodiments of the present disclosure may establish a forward path using a forward transmitted path probe packet and a backward path using a backward transmitted path probe packet (a path probe reply packet) to achieve path probe.

In a possible implementation, the link information described herein includes second link information and third link information. The second link information is used to identify a link between the source network node of the path probe request packet and the first network node. The third link information is used to identify a link between the first network node and a third network node, which may be the next hop of the first network node. Step S12 for establishing the first association based on link information included in a first path probe packet and the path label of the network path to be probed may include:

Establishing an association between the second link information, the third link information, and the path label of the network path to be probed as the first association; and Storing the first association at the first network node.

In an example, the first network node may write the path label to the IPOConn ID field of the aforementioned first association and write the second link information and the third link information to the corresponding next-hop fields (e.g., S2C next hop and C2S next hop), respectively. This way, the association among the second link information, the third link information, and the path label of the network path to be probed may be used to obtain the first association. The first association includes the association of the second link information with the path label of the network path to be probed. The first association also includes the association of the third link information with the path label of the network path to be probed.

In a possible implementation, the IP address described herein comprises the IP address of a source network node of the first path probe request packet and the IP address of a third network node, which is the next-hop network node of the first network node. Step S13 for establishing the third association based on the IP address in the first path probe request packet and the path label of the network path to be probed may comprise:

Establishing an association among the IP address of the source network node of the first path probe packet, the IP address of the third network node, and the path label of the network path to be probed as the third association; and Storing the third association at the first network node.

In an example, the first network node may write the path label to the IPOConn ID field of the first association and write the IP address of the source network node and the third network node IP address to the corresponding next-hop field (e.g., S2C next hop or C2S next hop) respectively. This way, an association among the IP address of the source network node, the IP address of the third network node and the path label of the network path to be probed may be obtain as the third association.

In a possible implementation, when a first path probe packet is sent from a source network node to a destination network node, the first path probe packet is used to determine a path from the source to the destination and a path from the destination to the source.

In an example, when a first path probe request packet arrives at a destination network node, a forward path and a backward path for transmission are established, the destination network node may not generate a path probe reply packet, and the path probe ends. Of course, in other examples, the destination network node may also generate a path probe reply packet to check whether the feedback path is correct (so as to have a bidirectional path). In this case, a network node does not determine the path based on the path probe reply packet.

In a possible implementation, when the first network node is the destination network node, the methods described herein include:

Generating a path probe reply packet that corresponds to a first path probe request packet.

In this implementation, when bidirectional path probe between the source network node and destination network node is complete, each network node on the path is capable of forwarding data packets bidirectionally.

Also in this implementation, the destination network node is the peer network node to the source network node on the path to be probed, and the source network node is the initiator of the first path probe request packet.

In an example, when a path probe request packet arrives at a destination network node from a source network node, a path from the destination network node to the source network node is established. The destination network node may generate a path probe reply packet and send the path probe reply packet for path verification (the destination may also not send a path probe reply packet). Further, since a bidirectional path is established, each network node on the path may forward data packets in any direction of the path. For example, the source network node may generate and forward data packets to the destination network node or other transit network nodes, and each network node may also forward data packets from the destination network node to the source network node.

Through the above method, embodiments of the present disclosure may use a first path probe packet to establish a forward path and a backward path simultaneously and thus improve the efficiency of the path probe.

Based on the above, in an example, when establishing the first association, the second link information may include the first link information from the first network node to a next-hop network node as described above, or the second link information may include the link information from "the next-hop network node" to the first network node (in a backward direction).

FIG. 4 is a flowchart illustrating an example of the path probe method described herein.

In a possible implementation, as shown in FIG. 4, the path probe methods include:

In step S14, determining the IP address of a third network node, which is the next hop of the first network node; and In step S15, generating a second path probe packet according to a first path probe packet and the IP address of the third network node, and then forwarding the second path probe packet.

By the above method, embodiments of the present disclosure may generate a second path probe request packet based on a first path probe request packet and the IP address of a third network node, and forward the second path probe packet for path probe.

In a possible implementation, determining the IP address of the third network node includes:

Determining the IP address of the third network node from a first path probe packet; or Acquiring third link information from the first path probe packet, wherein the third link information identifies an association between the first network node and the third network node; and Determining the IP address of the third network node based on the third link information.

Of course, the IP address of the third network node may also be obtained directly from the path probe packet. For this, the present disclosure imposes no restrictions.

In an example, acquiring the third link information from the first path probe packet may include obtaining the third link information from a list of link information included in the first path probe packet (see link list shown in FIG. 2).

In an example, the list of link information in the first path probe packet may be arranged in order. The first link information in the list may be the link information between the first network node and the next-hop network node, and the second link information may be the link information of the second network node and the next-hop network node. Therefore, the first link information in the link information list may be obtained as the third link information. Such link information may be popped out of the list to ensure that the first link information obtained subsequently from the list is the link information between the current network node and the next-hop network node.

Of course, the above description is illustrative, those skilled in the art may also obtain the third link information from the list of link information using other techniques. For example, an association may be set between the current network node and the third link information so that the third link information may be acquired from the list of link information based on the information of the current network node. Or, an order for obtaining the third link information may be set in a protocol. Other techniques may also be used, to which the present disclosure imposes no restrictions.

In a possible implementation, the process of acquiring the IP address of the third network node based on third link information may include:

Acquiring the IP address of the third network node based on the third link information and the second association.

As mentioned earlier, the second association may be preset, for example, by an orchestrator device and sent to each network node. Each network node may determine the IP address of the next-hop network node based on received link information and the second association to facilitate the forwarding of packets to the next-hop network node.

In a possible implementation, in step S15, generating the second path probe packet based on the first data packet and the IP address of the third network node may include:

Removing an IP header of the first path probe packet to get an intermediate data packet; and Encapsulating a new IP header outside the intermediate packet base on the IP address of the third network node to obtain the second path probe packet.

By the above method, the IP address in the first path probe request packet may be replaced by the IP address of the third network node to obtain the second path probe packet. The first network node may send the second path probe packet to the third network node according to the IP address in the second path probe packet to complete the forwarding of the path probe packet.

This disclosure does not limit the specific technique for removing the IP header and encapsulating the new IP header. Those skilled in the art may choose a relevant technique as needed Of course, when generating the second path probe packet, the content of the packet may also be adjusted according to the structure of the path probe packet. For example, the third link information may be used to update the current link information field in the intermediate path probe packet, pop up the third link information that may be at the first position in the link information list, or write other required instructions, etc.

In a possible implementation, when the first network node is a destination network node, the methods described herein may further include:

Generating a path probe reply packet that corresponds to a first path probe request packet; and/or Waiting to forward data packets along the path from the destination network node to the source network node.

In this implementation, the destination network node is the peer network node to the source network node on the path to be probed, and the source network node is the initiator of the first path probe request packet.

In a possible implementation, when the first network node is a source network node, the methods described herein may further include:

Completing bidirectional path probe between the source network node and a destination network node on the condition that the first path probe packet contains no IP address of a third network node, that there is no next hop or that there is preset indication information. Under these circumstances, each network node on the path may forward data packets bidirectionally and wait to receive a data packet to be forwarded on the path from the source network node to the destination network node.

In this implementation, the destination network node is the peer network node to the source network node on the path to be probed, and the source network node is the initiator of the first path probe request packet.

In the example where an IP address is determined based the third link information, if the first path probe packet is a reply packet from a destination network node to a source network node, the source network node determines the third link information based on the first path probe packet. If the link information list is empty, or there is no third link information of the next-hop network node (no IP address of the next-hop network node), or there is preset indication information (e.g., a preset terminator), the source network node may determine that the path probe is complete and that transmission paths from the source network node to the destination network node and back to the source network node are established. In this case, when the source network node needs to forward a packet, the packet forwarding may be carried out according to the acquired transmission paths.

In a possible implementation, the first network node may be a source network node, any transit network node, or a destination network node. The path probing process is illustrated below with specific examples.

In a possible implementation, an orchestrator device, as a controller of a transmission network, may establish link information between network nodes based on network node information in the transmission network and establish a second association for each link information. The orchestrator may also acquire information such as the IP addresses of the two adjacent network nodes associated with a link based on the relevant link information and the second association.

In an example, the orchestrator device may manage all the link information. For example, the orchestrator device may remove some low-quality connections between two network nodes and remove the corresponding link information and use the retained link information to form an overlay upper layer network. The overlay network is formed on the basis of an IP network. The orchestrator device may determine the optimal transmission path from a source network node to a destination network node in the overlay network to get all the link information of this optimal transmission path and to send all the link information to the end network nodes (source network node or destination network node) for path probe so that this optimal transmission path may be used to transmit packets Suppose the transmission path includes source network node A, transit network node B, transit network node C, and destination network node D.

FIG. 5a, FIG. 5b, FIG. 5c, FIG. 5d, FIG. 5e, FIG. 5f, and FIG. 5g show the schematic diagram of transmission paths through source network node A, transition network node B, transition network node C, and destination network node D respectively.

In an example, after the orchestrator device sends all information (or IP addresses) and path label(s) of the optimal transmission path(s) (to be probed) to the source network node A, the source network node may generate the first path probe request packet based on the path label and link information. For example, the source network node may use the first link information to determine the next-hop network node IP address based on the link information and the second association (as shown in FIG. 6a, the next-hop network node of source network node A is transit network node B), and the source network node may use the IP address and link information to generate a first path probe request packet.

In an example, the orchestrator device may also send the link information or IP address of a forward path to the source network node and the link information or IP address of a backward path to the destination network node. When the path probe request packet arrives at the destination network node, the destination network node may generate a path probe reply packet based on the link information or IP address of the backward path.

Figure 5A:
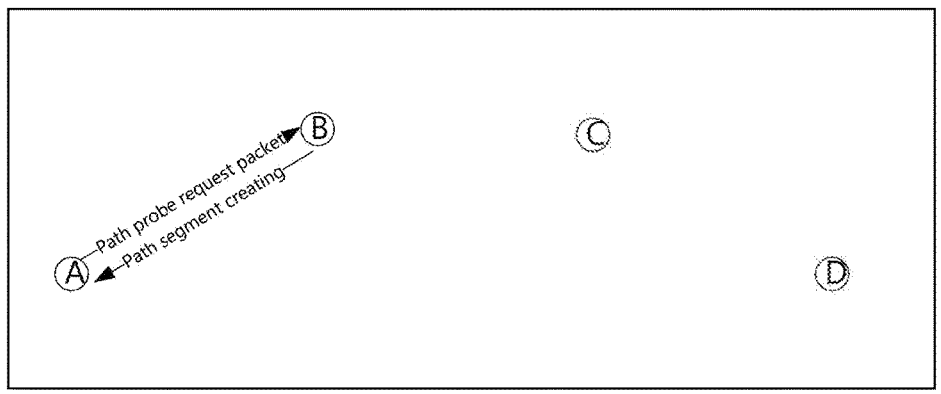
FIG. 5a, FIG. 5b, FIG. 5c, FIG. 5d, FIG. 5e, FIG. 5f, and FIG. 5g show schematic diagrams of example transmission paths at a source network node A, a transition network node B, a transition network node C, and a destination network node D respectively.

In an example, as shown in FIG. 5a, once the first path probe request packet is generated by source network node A, the first path probe request packet may be forwarded to the next-hop network node, transit network node B, to determine the path from the transit network node B to the source network node A.

In an example, as shown in FIG. 5a, upon receiving the first path probe request packet, the transit network node B (the current first network node) may acquire the second link information (or the IP address of the source network node) and the path label of the network path to be probed in the first path probe request packet, and establish the first association based on the second link information and the path label of the network path to be probed. The transit network node B may write the path label into the IPOConn ID field of the first association and write the second link information into the S2C next hop field of the first association, establish the association between the second link information and the path label of the network path to be probed to obtain the first association, and store the first association at transit network node B. After acquiring the first association, transit network node B may obtain the third link information in the first path probe request packet, determine the IP address of the third network node (transit network node C) based on the third link information, generate a second path probe request packet based on the first path probe request packet and the IP address of the third network node (transit network node C), and forward the second path probe request packet to the third network node (transit network node C) to determine the transmission path from transit network node C to transit network node B.

Figure 5B:
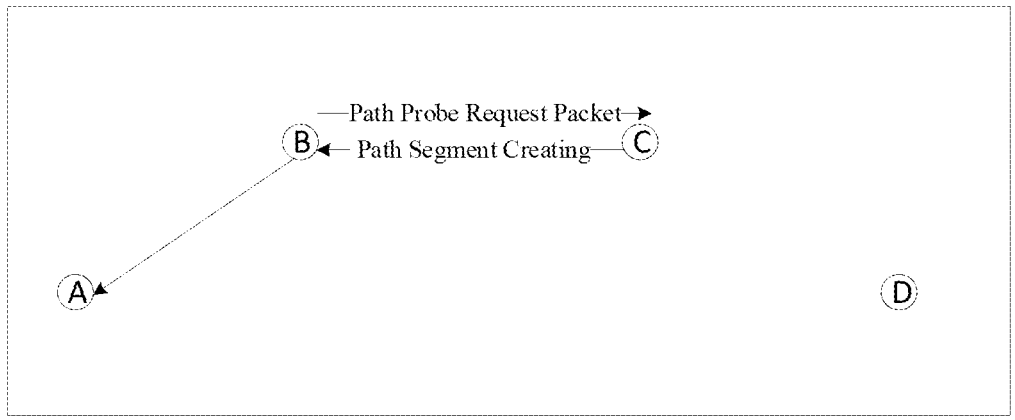

In an example, as shown in FIG. 5b, when transit network node C (the current first network node) receives the second path probe request packet, it may acquire the second link information and the path label of the network path to be probed in the second path probe request packet, and establish the first association based on the second link information and the path label of the network path to be probed. The transit network node C may write the path label into the IPOConn ID field of the first association and write the second link information to the S2C next-hop field of the first association to establish the association of the second link information and the path label of the path to be probed as the first association, and store the first association at transit network node C. After acquiring the first association, transit network node C may obtain the third link information in the second path probe request packet, determine the IP address of the destination network node D based on the third link information, generate a third path probe request packet based on the second path probe request packet and the IP address of the destination network node D, and forward the third path probe request packet to destination network node D to establish the transmission path from destination network node D to transit network node C.

Figure 5C:
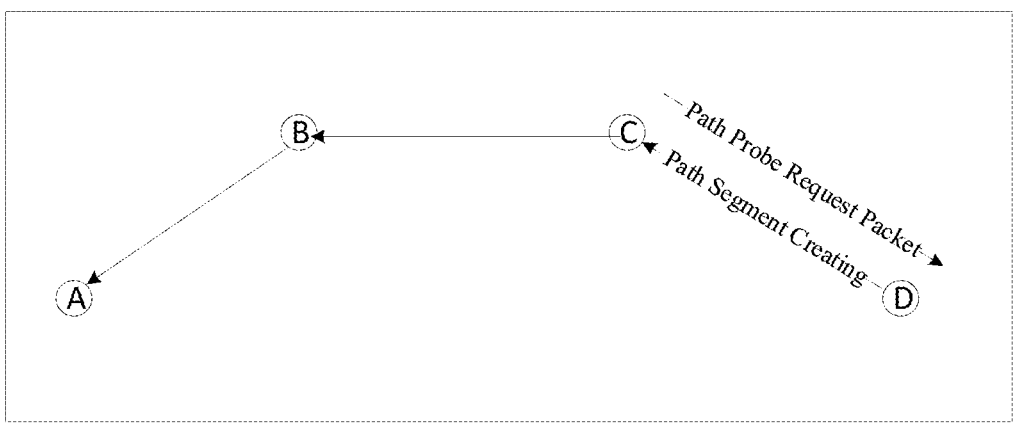

In an example, as shown in FIG. 5c, when destination network node D (the current first network node) receives the third path probe request packet (the current second path probe request packet), it may acquire the second link information and the path label of the network path to be probed in the third path probe request packet, and establish the first association based on the third link information and the path label of the network path to be probed. Destination network node D may write the path label into the IPOConn ID field of the first association and write the second link information to the S2C next-hop field of the first association to establish an association between the second link information and the path label of the path to be probed as the first association, and store the first association at transit network node C.

In an example, when the link information or IP address of both the forward path and the backward path are in the path probe request packet, the destination network node may use the link information or IP address of the backward path in the path probe request packet to generate a path probe reply packet; when the link information or IP address of the backward path is in the destination network node, the destination network node may obtain the link information or IP address of the backward path from the storage to generate the path probe reply packet.

After acquiring the first association, the destination network node D may obtain the third link information in the second path probe request packet (at this point, when the destination network node D is determined to be the destination network node based on the link information, the path probe reply packet will be generated, in which case the third network node is the first network node passed by the path probe reply packet). Destination network node D determines the IP address of transit network node C based on the third link information and generates the fourth path probe request packet based on the third path probe request packet and the IP address of the transit network node C. Destination network node D then forwards the fourth path probe request packet to transit network node C to determine the transmission path from transit network node C to destination network node D.

Figure 5D:
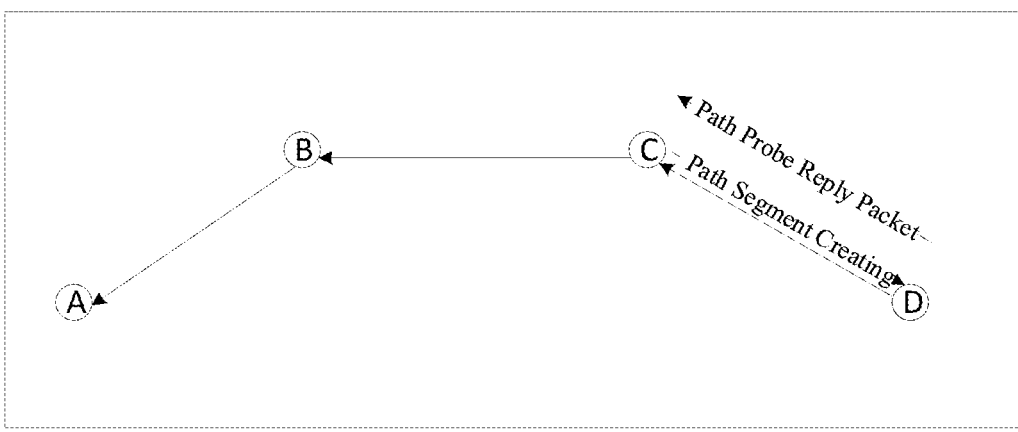

In an example, as shown in FIG. 5d, when transit network node C (the current first network node) receives the fourth path probe request packet (the current first path probe request packet), it may acquire the second link information and the path label of the network path to be probed in the fourth path probe request packet, and establish the first association based on the second link information and the path label of the network path to be probed.

Transit network node C may write the path label into the IPOConn ID field of the first association and write the second link information to the C2S next hop field of the first association to establish an association between the second link information and the path label of the path to be probed as the first association, and store the first association at transit network node C. After acquiring the first association, transit network node C may get the third link information in the first path probe request packet, acquire the IP address of the third network node (transit network node B) based on the third link information, generate a fifth path probe request packet based on the fourth path probe request packet and the IP address of the third network node (transit network node B), and forward the fifth path probe request packet to the third network node (transit network node B) to determine the transmission path from transit network node B to transit network node C.

Figure 5E:
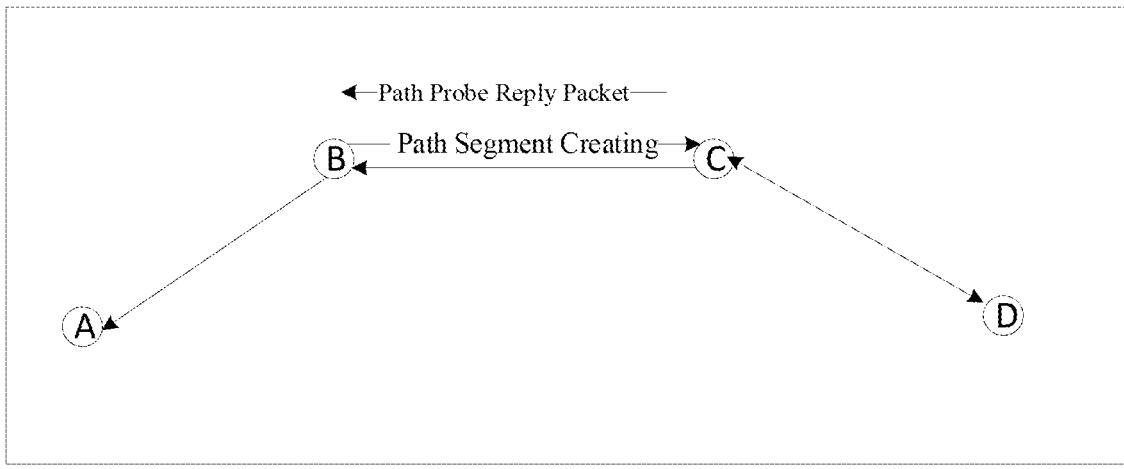

In an example, as shown in FIG. 5e, when transit network node B (the current first network node) receives the fifth path probe request packet (the current first path probe request packet), it may acquire the second link information and the path label of the network path to be probed in the fifth path probe request packet, and establish the first association based on the second link information and the path label of the network path to be probed. Transit network node B may write the path label into the IPOConn ID field of the first association and write the second link information to the C2S next hop field of the first association to establish an association between the second link information and the path label of the path to be probed as the first association, and store the first association at transit network node B. After acquiring the first association, transit network node B may get the third link information in the fifth path probe request packet, acquire the IP address of the third network node (the source network node) based on the third link information, generate a sixth path probe request packet based on the fifth path probe request packet and the IP address of the third network node (the source network node), and forward the sixth path probe request packet to the third network node (the source network node) to determine the transmission path from source network node A to transit network node B.

Figure 5F:
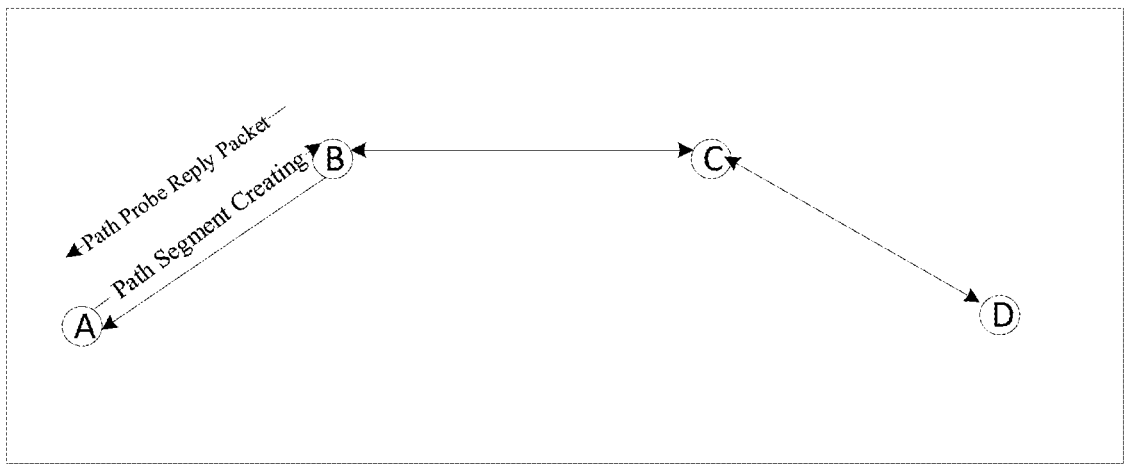
Figure 5G:
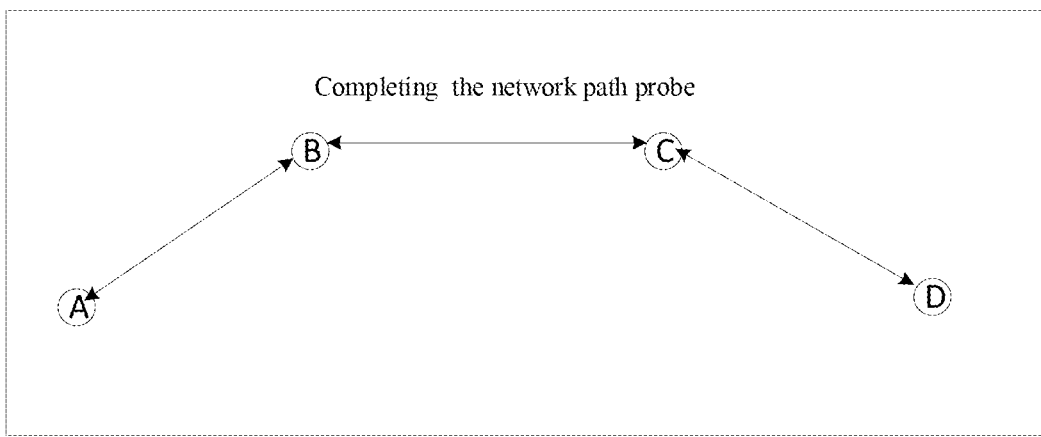

In an example, as shown in FIG. 5f, when source network node A (the current first network node) receives the sixth path probe request packet (the current first path probe request packet), it may acquire the second link information and the path label of the network path to be probed in the sixth path probe request packet, and establish the first association based on the second link information and the path label of the network path to be probed. The source network node A may write the path label into the IPOConn ID field of the first association and write the second link information to the C2S next hop field of the first association to establish an association of the second link information and the path label of the path to be probed as the first association, and store the first association at transit network node B. After getting the first association, source network node A may acquire the third link information in the sixth path probe request packet. When there is no third link information in the sixth path probe request packet and there is no next-hop network node, the path probe is completed and the path probe result is achieved as shown in FIG. 6g.

By the above method, the orchestrator device may select the optimal transmission path(s) in the network topology comprising multiple links and distribute the path information to the end network nodes (the source network node and the destination network node) of the network tunnel. After receiving the tunnel parameters (path label and/or link information), the source network node of the tunnel generates a path probe request packet and starts sending the path probe request packet to the destination, which carries all link information on the whole path. Each transit network node on the path maintains a label switch table (the first association). When the path probe request packet passes through the transit network node, the transit network node records the source of the packet (previous hop information) in the label switch table. After the path probe request packet arrives at the destination network node, the destination network node responds to the packet and returns a path probing reply packet. When the reply packet passes through a transit network node in the path in the backward direction, the transit network node records the backward path information in the label switch table. At this time, the transit network node records and stores the next-hop information in both directions of the path. When the path probe reply packet returns to the source network node, each transit network node on the path has finished recording the path information, at which time the path has been established and may be used for sending data packets.

When forwarding a packet, the ID (path label) of the path (tunnel) is carried in the data packet. For each transit network node (including source and destination network nodes), the next-hop information (the second link) may be acquired by querying the label switch table (the first association), and the next-hop information is used to encapsulate the outer network protocol to achieve path-optimized tunnel transmission.

Embodiments of the present disclosure establish a label switching mechanism based on IP source routing. Some probe request packets are sent at the beginning of path creation to build a path between a source network node and a destination network node, and when the path is fully established, transmission of data packets may start. A transit network node learns the path information from a path probe packet and saves the information as first association, which is also referred to as a label switch table. When data arrives at this network node, the next-hop forwarding direction is acquired by querying the local label switch table, so as to complete the data forwarding.

The above describes an example of path probe in which a backward path is established using a path probe packet transmitted in a forward direction and a forward path is established using a path probe packet (a path probe rely packet) transmitted in the backward direction. It should note that the scope of this disclosure is not limited to this example. As described above, a path probe packet transmitted in the forward direction may be used to establish a forward path or simultaneously establish a forward path and a backward path. The present disclosure imposes no restriction on the specific implementation.

When the probe of a transmission path is completed, each network node in the embodiments of the present disclosure may perform packet forwarding.

In a possible implementation, as shown in FIG. 4, the methods may further comprise:

In step S16, receiving a first data packet and determine the IP address of a second network node according to a path label in the first data packet;

In step S17, generating and forwarding a second path probe request packet according to a first path probe request packet and a second network node IP address.

Through the above devices, the first network node may determine the IP address of the second network node according to the path label in the first data packet, so as to generate the second data packet based on the first data packet and forward the second data packet. Control of any first network node in the process of packet transmission may be realized, and transmission efficiency and quality may be improved. At the same time, the size of management fields in an IP header for packet switching may be reduced so as to reduce the system overhead. In the transmission process, the number of network nodes may also be set according to needs to improve the expansion space. The data transmission is realized using an IP overlay mechanism based on label switching. Such a mechanism may reduce costs, realize the sharing of transmission resources, and enable the integration of resources across operators, cloud service providers, and other types of network service providers.

In a possible implementation, the transmission path of a data packet may include a source network node, at least one transit network node, and a destination network node. The first network node described herein may be a source network node, any transit network node, or a destination network node. It should be noted that the source network node of a data packet may be any network node in the transmission path and the destination network node may be any network node other than the first network node itself. That is, the data packet may start from any network node in the transmission path and may be sent to any other network node. As an example, the data packet may be sent from the source network node to the destination network node or any of the transit network nodes, or the data packet may be sent from the destination network node to the source network node or any of the transit network nodes. The embodiments provided in the present disclosure are not limited to a specific one of these situations. Each network node on the transmission path may generate a data packet to be sent from a source network node to a destination network node, and the source and destination network nodes in the transmission path may refer to two opposite end network nodes of the transmission path. In the following description, it is assumed that data packets are sent from a source network node to a destination network node to illustrate the path probe process. It should be understood that this assumption is not intended to limit the embodiments provided herein but to make it easier for the reader to understand.

In an example, when the first network node is a source network node, the first data packet may include an exemplary introduction of the path probe method in conjunction with a transmission path In an example, when the first network node is a source network node, the first data packet may include the packet to be forwarded (which may be referred to as service data) and a path label. The path label is the unique identification of a transmission path, and according to the path label, each network node may determine the information of a next-hop network node. That is, for a transmission path (or tunnel), the composition of that transmission path may be uniquely determined using the path label.

In this case, the path label in the first data packet may be sent by an orchestrator device, which may be responsible for managing and maintaining information for an entire network. By exercising centralized control, the orchestrator may unify the management and provisioning of end network nodes (source network nodes and destination network nodes), transit network nodes, and link information between network nodes, etc.

The above description of the possible application scenarios of the first network node should be understood as illustrative and should not be considered as a limitation of the present disclosure.

Figure 6:
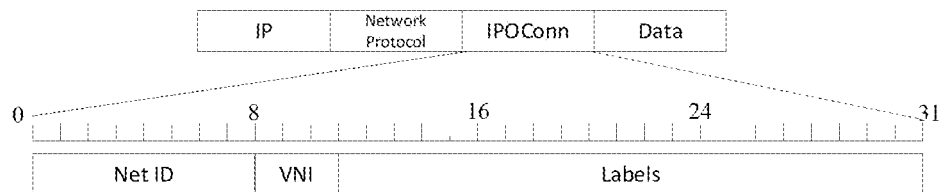
FIG. 6 is a schematic diagram illustrating an example of a data packet in accordance with one or more embodiments described herein.

FIG. 6 is a schematic diagram illustrating an example of a data packet.

In a possible implementation, as shown in FIG. 6, the data packet includes an IP field, an IPOConn field, and a data field, where the IP field may be used to carry IP address information of a next-hop network node, the IPOConn field may be used to carry a path label, and the data field may be used to carry packet data. In an example, the IP field may also include other network protocol address fields (not shown) for carrying other network protocol addresses. For example, the network protocol address fields may be used to carry network protocol address information for a next-hop network node.

In an example, as shown in FIG. 6, the IPOConn field may include multiple fields (e.g., NetId, VNI, an associated label). For example, the IPOConn field may include 32 Bits, of which NetId may occupy 8 Bits and may be used to identify a network; the associated label field (Label) may occupy 21 Bits and may be used to identify end-to-end links; the VNI field may occupy 3 Bits and may be used to identify tunnel connections of different priority levels between a same pair of end nodes. The VIN field may be used for tunnel QoS control.

In examples, a path label may refer to the information carried by the entire IPOConn field, or it may refer to the information carried by the associated label field. For different transmission paths, different labels may be configured, in which case either a label or the information carried by the entire IPOConn field may be etc. used to uniquely identify a transmission path without confusion.

Of course, this disclosure does not limit the specific configuration of the relevant labels. Those skilled in the art may set the labels as needed, as long as there is a unique label for each transmission path.

In a possible implementation, in step S16, acquiring an IP address of the second network node based on the path label in the first data packet includes:

Generating a first link information according to a path label in the first data packet, wherein the first link information identifies a link between the first network node and the second network node; and Acquiring the second network node IP address according to the first link information.

Through the above methods, the first link information is acquired according to the path label in the first data packet and the first link information is used to identify the IP address of the second network node.

In an example, when a source network node needs to send packet data, the source network node may, based on the path label, determine link information between the first network node (source network node) and the second network node (next-hop network node of the source network node) as the first link information. The first link information may be used to determine the IP address of the second network node, and the second data packet is generated and forwarded based on the first data packet.

In an example, when the first network node is a transit network node, the first data packet may be sent by a previous network node (such as the source network node or a previous transit network node), and the first data packet includes information such as a path label and packet data. When the first network node receives the first data packet, the first network node (the transition network node) may use the path label to determine first link information that indicates the link between the first network node and the second network node. The first link information may be used to determine the IP address of the second network node, and the second data packet is generated and forwarded based on the first data packet.

In an example, when the first network node is a destination network node, the first data packet may be originated from a previous-hop transit network node, and if the first network node (the destination network node) determines that there is no IP address of the second network node based on the path label in the first data packet (e.g., if there is no first link information in the first data packet, the first network node may determine that there is no IP address of the second network node), i.e., if there is no next-hop network node, the first network node may determine that it is a destination network node. The first network node may also determine that it is a destination network node based on preset indication information (e.g., a preset indication provided by the orchestrator device, various forms of termination symbols, etc.). In this case, if the IP address also includes other network protocol addresses, the first network node may forward the packet data to a corresponding application based on the other network protocol address (e.g., UDP address) in the first data packet.

The above description of the possible application scenarios of the first network node should be understood as illustrative and should not be considered as a limitation of the present disclosure.

The following describes possible implementations of each step of the path probe method.

In a possible implementation, acquiring the first link information based on the path label in the first data packet may include:

Determining the first link information based on the path label in the first data packet and a pre-established association indicating an association between the path label and the first link information.

By the above method, the first network node may acquire the first link information based on the path label and the first association to facilitate the determination of information regarding a next-hop network node.

In a possible implementation, acquiring the IP address of the second network node based on a first link information may include:

Acquiring the second network node IP address according to the first link information and a pre-established the second association which indicates the relationship between the link information and corresponding network node IP address.

By the above method, the first network node may acquire the IP address of the second network node according to the first link information and the second association for the subsequent generation of the second data packet.

In an example, the second association may be established in advance and each network node in the transmission path may maintain its second association. The second association may be in the form of a table or in some other forms, to which the present disclosure imposes no restrictions.

In an example, the second association may be used to acquire the IP address of a second network node that is associated with the first link information.

The above describes example ways for acquiring an IP address based on the link information, the first association, and the second association. The scope of the present disclosure is not limited to these examples, and other possible ways of implementation are described below.

In a possible implementation, each network node may include a network node identification (ID), and the second association may also include an association between the link information and the network node, and an association between the network node ID and an IP address. Step S120 of this disclosure for acquiring the IP address of the second network node based on the first link information may include:

Determining the IP address of the second network by determining the second network node ID based on the first link information and the second association, and determining the IP address of the second network node based on the second network node ID.

In a possible implementation, acquiring the IP address of the second network node based on the path label in the first data packet may include:

Acquiring a third network node IP address according to a path label in the first data packet and a third association which indicates the relationship between the path label and the IP address of the second network node.

In a possible implementation, the third association may be established in advance and assigned by the orchestrator device, to which the present disclosure imposes no restrictions.

In one example, the first association and the second association may be combined to obtain the third association between the path label and the IP address; or the third association between the path label and the IP address of the second network node may be directly established. Thus, the IP address of the second network node may be acquired based on the path label of the first data packet. The present disclosure imposes no restrictions on this technique.

In a possible implementation, step S17 for generating the second data packet based on the path label in the first data packet and the IP address of the second network node may include:

Removing the IP header of the first data packet to get an intermediate data packet.

Encapsulating a new IP header outside the intermediate date packet on the base of the IP address of the second network node to form the second data packet.

By the above method, the IP address in the first data packet may be replaced by the IP address of the second network node to obtain the second data packet. The first network node may send the second data packet to the second network node according to the IP address in the second data packet to complete the forwarding of the data packet.

It should be noted that the IP address field in the data packet may include multiple address sub-fields. For example, the IP address field may include a source network node address sub-field, a current network node address sub-field, a next-hop network node address sub-field, etc. In generating the second data packet, the address in the next-hop network node address sub-field may be modified. In the example above, the present disclosure describes the modification of the IP address and network protocol address of the next-hop network node in the first data packet. In other implementations of this disclosure, the IP address in the source network node address sub-field and other address sub-fields may be modified or may not modified. To this, the present disclosure imposes no restrictions.

This present disclosure does not limit the specific technique for removing IP headers and encapsulating new IP headers, and a person skilled in the art may apply a relevant technology as needed.

The following describes the path probe method using a source network node, a transit network node, and a destination network node of a transmission path as examples.

In an example, when a source network node needs to send packet data (the packet data may be generated by the source network node or received from other devices), the source network node (the current first network node) uses the path label of a pre-configured transmission path to query and identify a first association stored in the source network node and determine first link information with a next-hop network node (a transit network node). The source network node uses the first link information to query and identify a second association so as to determine the IP address of the transit network node. After acquiring the IP address of the transit network node, the source network node updates the IP address field and the network protocol address field in the first data packet using the IP address of the transit network node to obtain a second data packet. The source network node then forwards the second data packet to the transit network node.

In an example, when the transit network node (or the current first network node) receives a second data packet (or the current first data packet), the transmit network node may use the path label in the second data packet to query and identify a first association stored in the transit network node so as to acquire the first link information associated with a next-hop network node (a destination network node) and use the first link information to query and identify a stored second association so as to acquire the IP address of the destination network node. After acquiring the IP address of the destination network node, the transit network node updates the IP address field and the network protocol address field in the second data packet (a current first data packet) using the IP address of the next-hop network node to obtain a third data packet (a current second data packet) and forwards the third data packet to the next-hop network node (the destination network node).

In an example, when the destination network node (a current first network node) receives the third data packet (a current first data packet), it uses the path label in the third data packet to query its stored first association to acquire the first link information associated with a next-hop network node. If it is determined that the corresponding first link information does not exist, the destination network node may determine that there is no next-hop network node (the destination network node may determine that there is no IP address of the next-hop network node if the corresponding first association information does not exist). In this case, the current network node is the destination network node and the destination network node may deliver the packet data included in the third data packet to an application corresponding to the network protocol address. It is also possible to use link information sent by an orchestrator device to the destination network node to jointly confirm whether the current network node is the destination network node. With the two indications, the current network node may be confirmed as the destination network node and may deliver the packet data to the application.

It should be understood that the above description is illustrative, and the number of transit network nodes may be set according to the actual situation and needs. For this, the embodiments of the present disclosure impose no restrictions.

The above is a description of an example path probe process using link information, a first association, and a second association. It should be understood that a similar process may be used to forward packets based on IP addresses and a third association. This process is not described again in the present disclosure.

Through the above method, the embodiments of the present disclosure may exercise control over an arbitrary number of transit network nodes, which improves transmission efficiency and quality. At the same time, the methods described herein may reduce the length of a header management field(s) required for packet switching, thus also reducing the system overhead. The number of network nodes may be set as needed during the transmission process, which improves the expansion space. Data transmission is realized using an IP overlay mechanism based on label switching, which may also reduce costs, share transmission resources, and integrate resources across carriers, cloud providers, and other types of network service providers.

Figure 7:
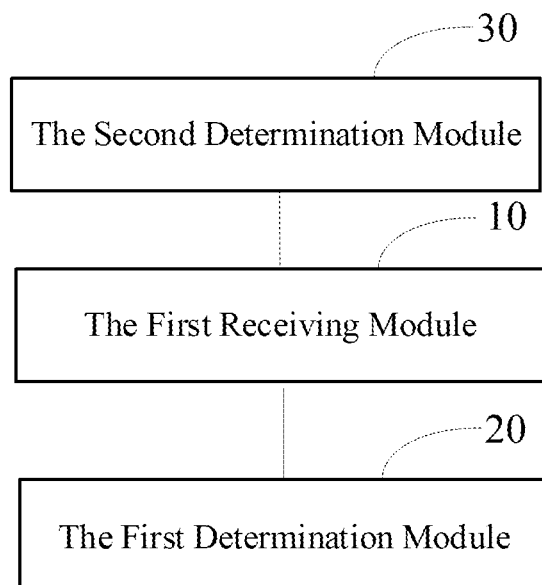
FIG. 7 is a block diagram illustrating an example of a path probe device in accordance with one or more embodiments described herein.

FIG. 7 illustrates a block diagram of a path probe device.

As FIG. 7 shows, the path probe device operating as the first network node includes:

A first receiving module 10 for receiving a first path probe request packet for path probe;

A first determination module 20 electrically connected to the first receiving module 10 and configured to determine the first association based on the link information in the first path probe request packet and the path label of the network path to be probed. The link information is used for identifying an association between the first network node and an adjacent network node. The first association includes an association of the path label and the link information; or A second determination module 30 electrically connected to the first receiving module 10 for determining a third association based on the IP address in the first path probe request packet and the path label of the network path to be probed The IP address includes the IP address of an adjacent network node of the first network node, and the third association includes the association between the path label and the IP address of the second network node.

Using the above device, embodiments of the present disclosure may establish the first association based on the second link information in the first path probe request packet and the path label of the network path label of the network path to be probed, or the third association based on the IP address in the first path probe request packet and the path label of the network path label of the network path to be probed, so as to establish a path from the first network node to the source network node. The path probe method in the implementation of the present disclosure reduces the overhead of the system. In the transmission process, the number of network nodes may also be set according to needs to improve the expansion space. The data transmission is realized using an IP overlay mechanism based on label switching. Such a mechanism may reduce costs, realize the sharing of transmission resources, and enable the integration of resources across operators, cloud service providers, and other types of network service providers.

In a possible implementation, the link information includes second link information. The second link information is used to identify a link between the source network node of the first path probe request packet and the first network node. Establishing the first association based on the link information in the first path probe request packet and the path label of the network path to be probed may include:

Establishing an association between the second link information and the path label of the network path to be probed as the first association; and Storing the first association at the first network node.

In a possible implementation, the link information includes third link information. The third link information is used to identify a link between the first network node and the third network node. The third network node is the next hop of the first network node. Establishing the first association based on the link information in the first path probe request packet and the path label of the network path to be probed may include:

Establishing an association between the third link information and the path label of the network path to be probed as the first association; and Storing the first association at the first network node.

In a possible implementation, the link information includes second link information and third link information. The second link information is used to identify a link between the source network node of the first path probe request packet and the first network node. The third link information is used to identify a link between the first network node and the third network node. The third network node is the next hop of the first network node. Establishing the first association based on the link information in the first path probe request packet and the path label of the network path to be probed may include:

Establishing an association among the second link information, the third link information, and the path label of the network path to be probed as the first association; and Storing the first association at the first network node.

In a possible implementation, the IP address includes the IP address of the source network node of the first path probe request packet. Establishing the third association based on the IP address in the first path probe request packet and the path label of the network path to be probed may include:

Establishing an association between the source network node IP of the first path probe request packet and the path label of the network path to be probed as the third association; and Storing the third association at the first network node.

In a possible implementation, the IP address includes the IP address of a third network node. The third network node is the next hop of the first network node. Establishing the third association based on the IP address in the first path probe request packet and the path label of the network path to be probed may include:

Establishing an association between the IP address of the third network node and the path label of the network path to be probed to obtain the third association; and Storing the third association at the first network node.

In a possible implementation, the IP address includes the IP address of the source network node of the first path probe request packet and the IP address of a third network node IP address. The third network node is the next hop of the first network node. Establishing the third association based on the IP address in the first path probe request packet and the path label of the network path to be probed may include:

Establishing an association among the source IP address of the first path probe request packet, the IP address of the third network node, and the path label of the network path to be probed as the third association; and Storing the third association at the first network node.

In a possible implementation, the path probe device includes: A first acquisition module configured to acquire the IP address of the third network node and set the third network node as the next hop of the first network node;

A second generation module electrically connected to the first acquisition module and configured to generate and forward a second path probe request packet according to the first path probe request packet and the third network node IP address.

In a possible implementation, acquiring the IP address of the third network node includes:

Getting the third network node IP address from the first path probe request packet; or Acquiring the third link information in the first path probe request packet, wherein the third link information identifies a link between the first network node and the third network node; and Acquiring the second-generation third network node IP address based on the third link information.

In a possible implementation, when the first path probe request packet is a packet from the source network node to the destination network node, the first path probe request packet is used to determine the path from the destination to the source.

When the first path probe request packet is the path probe reply packet sent from the destination network node to the source network node, the first path probe request packet is used to determine the path from the source to the destination.

In this implementation, the path along which the path probe request packet travels from the source to the destination is the same as the path along which the path probe reply packet path travels from the destination network node to the source network node.

In a possible implementation, when the first path probe request packet is a packet from the source network node to the destination network node, the first path probe request packet is used to the path from the source network node to the destination; or when the first path probe request packet is the path probe reply packet which is from the destination network node to the source network node, the first path probe request packet is used to determine the path from the destination to the source.

The path probe request packet sent from the source network node to the destination network node may be the same as or may be different from the path second-generation probe reply packet which is from the destination network node to the source network node.

In a possible implementation, when the first path probe request packet is sent from the source network node to the destination network node, the first path probe request packet is used to determine the bidirectional path between the source and the destination.

In a possible implementation, when the first network node a destination network node, the path probe device may include:

A first generation module configured to generate the path probe reply packet the first path probe request packet;

In a possible implementation, when the path probe from the destination network node to the source network node is complete, each network node is capable of forwarding a data packet along the path;

In a possible implementation, when a bidirectional path probe between the source network node and destination network node is completed, each network node on the path is capable of forwarding data packets bidirectionally;

In a possible implementation, when the path probe from the source network node to the destination network node is complete, each network node on the path is capable of forwarding data packets.

The path probe device may include a packet forwarding module configured to forward the data packet from a destination network node to a source network node, wherein the destination network node is the peer network node to the source network node on the path to be probed, and the source network node is the initiator of the first path probe request packet.

It should be noted that, in the implementations of the present disclosure, each network node has a packet forwarding module, and may also have a packet generating module, so as to generate a data packet and forward the data packet when the path establishment is completed.

The description of data packet forwarding at the end of path probe is provided in the previous sections, which is not repeated here.

In a possible implementation, when the first network node is a source network node, the path probe device may include:

A fifth determination module configured to determine that the path probe is completed and receive a forwarded data packet on the path from the source network node to the destination network node, given that the first path probe request packet contains no IP address of a third network node, or there is no next hop, or there is preset indication information.

The destination network node is the peer network node to the source network node on the path to be probed, and the source network node is the initiator of the first path probe request packet.

In a possible implementation, when the first network node is a source network node, the path probe device includes:

A second receiving module configured to receive all link information, IP address(es), and path label(s) associated with the path to be probed;

A second generation module, which is connected to the second receiving module, and is used to generate the first path probe request packet based on all link information, IP addresses, and path label(s) of the path to be probed.

In a possible implementation, the path probe device may include: A third receiving module configured to second-generation receive the first data packet and acquire the IP address of the second network node according to the path label in the first data packet; and A third generation module configured to electrically connected to the third receiving module to generate the second data packet according to the IP address of the second network node and forward the second data packet.

In a possible implementation, acquiring the IP address of the second network node based on the path label in the first data packet includes:

Determining the first link information according to the path label in the first data packet, wherein the first link information is used to identify a link between the first network node and the second network node; and Acquiring the second network node IP address according to the first link information.

In a possible implementation, acquiring the first link information based on the path label in the first data packet includes:

Determining the first link information based on the path label in the first data packet and first association.

In a possible implementation, the process of acquiring the IP address of the second network node based on the first link information may include:

Acquiring the second network node IP address according to the first link information and the pre-established second association.

In a possible implementation, acquiring the IP address of the second network node based on the path label in the first data packet includes:

Acquiring the IP address of the second network node according to the path label in the first data packet and the third association.

In a possible implementation, generating the second data packet based on the path label in the first data packet and the IP address of the second network node may further include:

Removing the IP header of the first data packet to get an intermediate data packet; and Encapsulating a new IP header outside the intermediate date packet on the base of the IP address of the second network node to get the second data packet.

In a possible implementation, the path probe device may include: A third determination module: when it is acquired that no IP address of the second network node exists according to the path label in the first data packet or indicates itself as the target network node according to the preset indication information, it will determine one network node itself as the target network node.

Implementations of the disclosure utilize a label switching mechanism for IP source routing. Some probe request packets are sent at the beginning of path creation to build a path between a source network node and a destination network node. When the path is fully established, transmission of data packets may start. A transit network node learns the path information from a probe request packet and saves it to a first association which may also be referred to as a label switch table. When data arrives at this network node, a next hop forwarding direction is acquired by querying the local label switch table, so as to complete the data forwarding.

Figure 8:
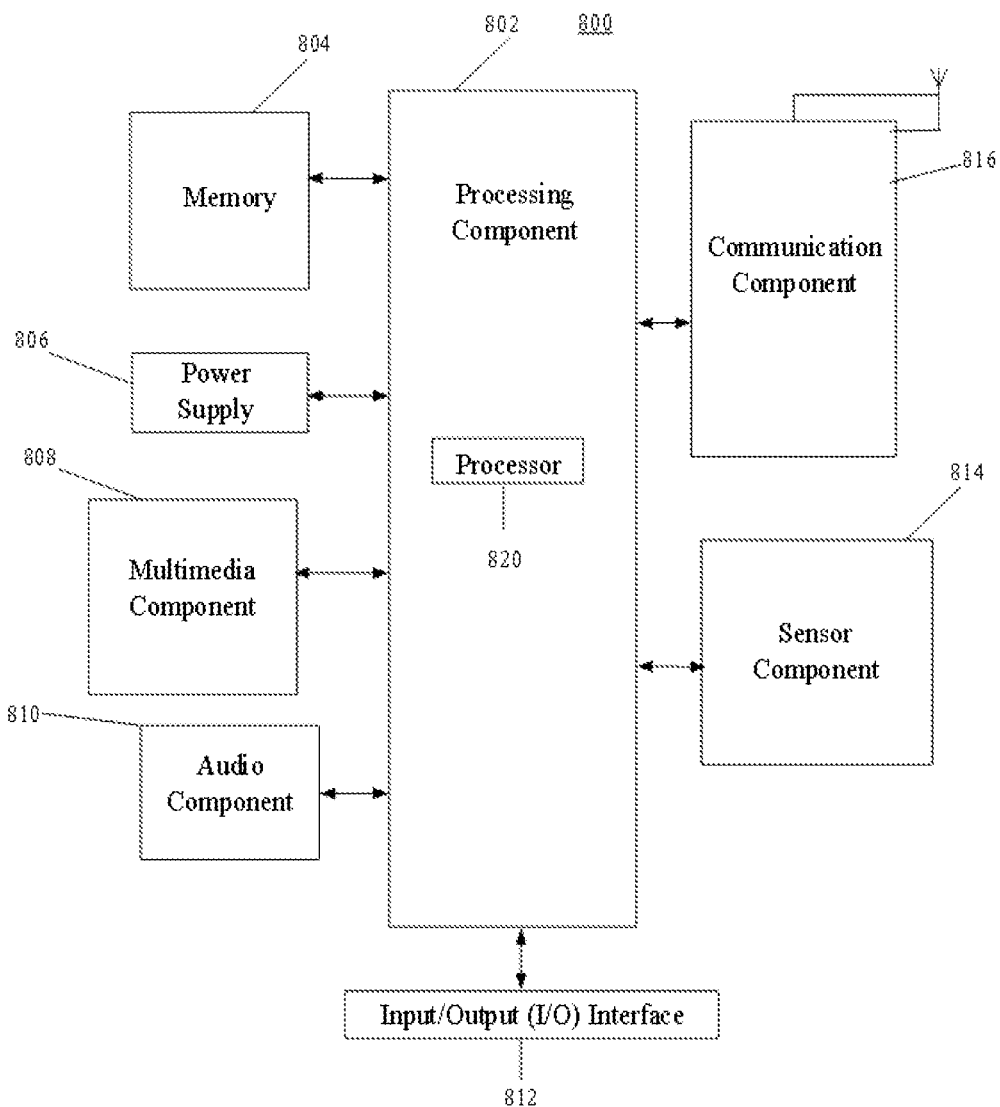
FIG. 8 is a block diagram illustrating an example of a path probe device in accordance with one or more embodiments described herein.

FIG. 8 is a block diagram illustrating a path probe device 800.

For example, the device 800 may be a mobile phone, a computer, a digital broadcasting terminal, a messaging device, a game console, a tablet device, a medical device, a fitness device, a personal digital assistant, etc.

The device 800 may include one or more of the following components: a processing component 802, a memory component 804, a power supply component 806, a multimedia component 808, an audio component 810, an input/output (I/O) interface 812, a sensor 814, and the communication component 816.

The processing component 802 generally controls the overall operations of the device 800, such as operations associated with display, telephone calls, data communications, camera operations, and recording operations.

The processing component 802 may include one or more processors 820 to execute instructions to complete all or part of the steps of the foregoing method.

In addition, the processing component 802 may include one or more modules to facilitate the interaction between the processing component 802 and other components.

For example, the processing component 802 may include a multimedia module to facilitate the interaction between the multimedia component 808 and the processing component 802.

The memory 804 is configured to store various types of data to support operations in the device 800.

Examples of such data include instructions for any application or method operating on the device 800, contact data, phonebook data, packets, pictures, videos, etc.

The memory 804 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 806 provides power for various components of the device 800.

The power supply component 806 may include a power management system, one or more power supplies, and other components associated with generating, managing, and distributing power for the device 800.

The multimedia component 808 includes a screen that provides an output interface between the device 800 and the user.

In some implementations, the screen may include a liquid crystal display (LCD) and a touch panel (TP).

If the screen includes a touch panel, the screen may be implemented as a touch screen to receive input signals from the user.

The touch panel includes one or more touch sensors to sense touch, sliding, and gestures on the touch panel.

The touch sensor may not only sense the boundary of a touch or slide action but also probe the duration and pressure related to the touch or slide operation.

In some implementations, the multimedia component 808 includes a front camera and/or a rear camera.

When the device 800 is in an operation mode, such as a shooting mode or a video mode, the front camera and/or the rear camera may receive external multimedia data.

Each front camera and rear camera may be a fixed optical lens system or have focal length and optical zoom capabilities.

The audio component 810 is configured to output and/or input audio signals.

For example, the audio component 810 includes a microphone (MIC), and when the device 800 is in an operation mode, such as a call mode, a recording mode, and a voice recognition mode, the microphone is configured to receive an external audio signal.

The received audio signal may be further stored in the memory 804 or transmitted via the communication component 816.

In some implementations, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like.

These buttons may include but are not limited to: home button, volume button, start button, and lock button.

The sensor component 814 includes one or more sensors for providing the device 800 with various aspects of status assessment.

For example, the sensor component 814 may probe the open/close state of the device 800 and the relative positioning of components, such as the display and the keypad of the device 800. The sensor component 814 may also probe the position change of the device 800 or a component of the device 800, the contact status between the user and the device 800, the orientation, and the temperature change speed of the device 800.

The sensor component 814 may include a proximity sensor configured to probe the presence of nearby objects when there is no physical contact.

The sensor component 814 may also include a light sensor, such as a CMOS or CCD image sensor, for use in imaging applications.

In some implementations, the sensor component 814 may also include an acceleration sensor, a gyroscope sensor, a magnetic sensor, a pressure sensor, or a temperature sensor.

The communication component 816 is configured to facilitate wired or wireless communication between the device 800 and other devices.

The device 800 may access a wireless network based on a communication standard, such as WIFI, 2G, or 3G, or a combination thereof.

In an exemplary implementation, the communication component 816 receives a broadcast signal from an external broadcast management system via a broadcast channel.

In an exemplary implementation, the communication component 816 further includes a near field communication (NFC) module to facilitate short-range communication.

For example, the NFC module may be implemented based on radio frequency identification (RFID) technology, infrared data association (IrDA) technology, ultra-wideband (UWB) technology, Bluetooth (BT) technology, and other technologies.

In an exemplary implementation, the device 800 may be implemented by one or more application-specific integrated circuits (ASIC), digital signal processors (DSP), digital signal processing equipment (DSPD), programmable logic devices (PLD), field programmable Implemented by a gate array (FPGA), controller, microcontroller, microprocessor, or other electronic components, used to perform the above-mentioned methods.

In exemplary implementations, there is a non-volatile computer-readable storage medium, such as a memory 804 for computer program instructions, which is executable by processor 820 of device 800 to accomplish the methods described above.

Figure 9:
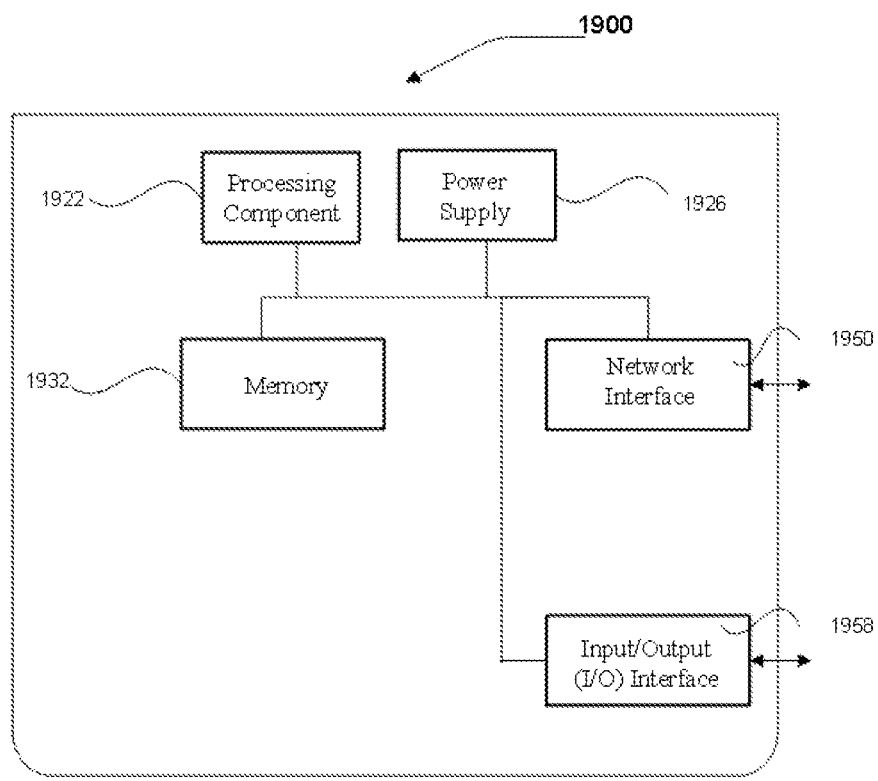
FIG. 9 is a block diagram illustrating an example of a path probe device in accordance with one or more embodiments described herein.

FIG. 9 is a block diagram illustrating a path probe device 1900.

For example, the device 1900 may be provided as a server.

In FIG. 9, the device 1900 includes a processing component 1922, which further includes one or more processors, and a memory resource represented by the memory 1932, for storing instructions executable by the processing component 1922, such as application programs.

The application program stored in the memory 1932 may include one or more modules, each corresponding to a set of instructions.

In addition, the processing component 1922 is configured to execute instructions to perform the above-described methods.

The device 1900 may also include a power supply component 1926 configured to perform power management of the device 1900, a wired or wireless network interface 1950 configured to connect the device 1900 to a network, and an input-output (I/O) interface 1958.

The device 1900 may operate based on an operating system stored in the memory 1932, such as Windows Server™, Mac OS X™, Unix™, Linux™, FreeBSD™, or the like.

In exemplary implementations, there is a non-volatile computer-readable storage medium, such as a memory 1932 for computer program instructions, which is executable by processor 1922 of device 1900 to accomplish the methods described above.

The present disclosure may be applicable to a system, method, and/or computer program product.

The computer program product may include a computer-readable storage medium loaded with computer-readable program instructions for enabling a processor to implement various aspects of the disclosure.

The computer-readable storage medium may be a tangible device that may hold and store instructions used by the instruction execution device.

The computer-readable storage medium may be, for example, but not limited to, an electrical storage device, a magnetic storage device, an optical storage device, an electromagnetic storage device, a semiconductor storage device, or any suitable combination of the foregoing.

More specific examples (non-exhaustive list) of computer-readable storage media include portable computer disks, hard disks, random access memory (RAM), read-only memory (ROM), erasable programmable read-only memory (EPROM), flash memory, static random access memory (SRAM), portable compact disk read-only memory (CD-ROM), digital versatile disk (DVD), memory stick, floppy disk, mechanical encoding device, such as punched cards or raised structures with instructions stored thereon, and any suitable combination of the above.

Computer-readable storage media as used herein are not to be interpreted as transient signals per se, such as radio waves or other freely propagating electromagnetic waves, electromagnetic waves propagating through waveguides or other transmission media (e.g., light pulses through fiber-optic cables), or electrical signals transmitted through wires.

The computer-readable program instructions described herein may be downloaded from a computer-readable storage medium to various computing/processing devices or downloaded to an external computer or external storage device via a network, such as the Internet, a local area network, a wide area network, and/or a wireless network.

The network may include copper transmission cables, optical fiber transmission, wireless transmission, routers, firewalls, switches, gateway computers, and/or edge servers.

The network adapter card or network interface in each computing/processing device receives computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, state setting data, or source or object code written in any combination of one or more programming languages, the programming languages including object-oriented programming languages—such as Smalltalk, C++, etc., as well as conventional procedural programming languages such as "C" or similar programming languages.

Computer-readable program instructions may be executed entirely on the user's computer, partly on the user's computer, as a stand-alone package, partially on the user's computer, partially on a remote computer, or entirely on a remote computer or server In the case of a remote computer, the remote computer may be connected to the user's computer through any kind of network including a local area network (LAN) or a wide area network (WAN). It may be connected to an external computer through an Internet service provider In some implementations, the disclosure achieved by personalizing an electronic circuit, such as a programmable logic circuit, field-programmable gate array (FPGA), or programmable logic array (PLA), that may execute computer-readable program instructions by utilizing the state information of the computer-readable program instructions The present disclosure is described herein with reference to flowcharts and/or block diagrams of methods, devices (systems), and computer program products according to implementations of the present disclosure.

It should be understood that each block of the flowcharts and/or block diagrams, and combinations of blocks in the flowcharts and/or block diagrams, may be implemented by computer-readable program instructions.

These computer-readable program instructions may be provided to a processor of a general-purpose computer, special purpose computer, or other programmable data processing device to produce a machine. These machines enable the instructions to produce a device that implements the function/action specified in one or more blocks in the flowchart and/or block diagram when executed through the processor of the computer or other programmable data processing device.

It is also possible to store these computer-readable program instructions in a computer-readable storage medium. These instructions cause the computer, programmable data processing device, and/or other devices to operate in a particular manner. A computer-readable medium having instructions stored thereon then includes an article of manufacture that includes instructions for implementing the functions/actions specified in one or more boxes in a flowchart and/or block diagram.

Computer-readable program instructions may also be loaded onto a computer, other programmable data processing devices or other devices so that a series of operational steps are performed on the computer, other programmable data processing devices, or other devices to produce a computer-implemented process. The instructions executed on the computer, other programmable data processing devices, or other devices are thereby caused to implement the function/action specified in one or more blocks in the flowchart and/or block diagram.

The flowcharts and block diagrams in the accompanying drawings show the architecture, functionality, and operation that may be implemented in systems, methods, and computer program products according to multiple implementations of the present disclosure.

At this point, each box in a flowchart or block diagram may represent a module, program segment, or part of an instruction that contains one or more executable instructions for implementing a defined logical function.

In some alternative implementations, the functions marked in the block may also occur in a different order than the order marked in the drawings.

For example, two consecutive blocks may be executed substantially in parallel, or they may sometimes be executed in the backward order, depending on the functions involved.

Note also that each box in the block diagram and/or flowchart, and the combination of boxes in the block diagram and/or flowchart, may be implemented with a dedicated hardware-based system that performs the specified function or action, or may be implemented with a combination of dedicated hardware and computer instructions.

The implementations of the present disclosure have been described above, and the above description is exemplary, not exhaustive, and is not limited to the disclosed implementations.

Without departing from the scope and spirit of the described implementations, many modifications and changes are obvious to those of ordinary skill in the art.

The choice of terms used herein is intended to best explain the principles, practical applications, or technical improvements in the market of each implementation, or to enable other ordinary skilled in the art to understand the various implementations disclosed herein.

The invention claimed is:

1. A method implemented by a network node, the method comprising:
　　receiving a path probe request packet from a first neighboring network node, wherein the path probe request packet indicates at least a network address of the first neighboring network node or a network link between the network node and the first neighboring network node, the path probe request packet further including a first path label associated a first network path;
　　establishing a first association between the first path label and the network address of the first neighboring network node or between the first path label and the network link between the network node and the first neighboring network node;

storing information regarding the first association at the network node, wherein the information indicates that the first neighboring network node or the network link between the network node and the first neighboring network node forms a part of the first network path identified by the first path label;

transmitting the path probe request packet to a second neighboring network node;

receiving a path probe reply packet from the second neighboring network node, wherein the path probe reply packet indicates at least a network address of the second neighboring network node or a network link between the network node and the second neighboring network node, the path probe reply packet further including a second path label associated with a second network path;

establishing a second association between the second path label and the network address of the second neighboring network node or between the second path label and the network link between the network node and the second neighboring network node;

storing the second association at the network node;

transmitting the path probe reply packet to the first neighboring network node;

determining that a data packet is associated with the first path label; and transmitting the data packet to the first neighboring network node based on the information stored at the network node that indicates that the first neighboring network node or the network link between the network node and the first neighboring network node forms the part of the first network path identified by the first path label.

2. The method of claim 1, wherein the first neighboring network node is a destination node of the first network path.

3. The method of claim 1, wherein the first neighboring network node is an intermediate node of the first network path.

4. The method of claim 1, wherein the second neighboring network node is a source node of the first network path.

5. The method of claim 1, wherein the path probe request packet further indicates the network address of the second neighboring network node or the network link between the network node and the second neighboring network node, and the method further comprises:
   establishing a third association between the first path label and the network address of the second neighboring network node or between the first path label and the network link between the network node and the second neighboring network node; and
   storing the third association at the network node.

6. The method of claim 1, wherein the path probe request packet is generated by an end node of the first network path based on information provided by an orchestrator.

7. The method of claim 6, wherein the information provided by the orchestrator indicates at least one of the network address of the first neighboring network node or the network link between the network node and the first neighboring network node, the information provided by the orchestrator further including the first path label.

8. The method of claim 1, wherein the first network path forms a part of a network that overlays an internet protocol (IP) based public network.

9. The method of claim 1, further comprising receiving an indication that the first network path has been established, wherein the data packet is transmitted along the first network path in response to receiving the indication that the first network path has been established, and wherein the data packet includes a data payload and the first path label associated with the first network path.

10. A network node, comprising:
one or more processors configured to:
receive a path probe request packet from a first neighboring network node, wherein the path probe request packet indicates at least a network address of the first neighboring network node or a network link between the network node and the first neighboring network node, the path probe request packet further including a first path label associated a first network path;

establish a first association between the first path label and the network address of the first neighboring network node or between the first path label and the network link between the network node and the first neighboring network node;

store information regarding the first association at the network node, wherein the information indicates that the first neighboring network node or the network link between the network node and the first neighboring network node forms a part of the first network path identified by the first path label;

transmit the path probe request packet to a second neighboring network node;

receive a path probe reply packet from the second neighboring network node, wherein the path probe reply packet indicates at least a network address of the second neighboring network node or a network link between the network node and the second neighboring network node, the path probe reply packet further including a second path label associated with a second network path;

establish a second association between the second path label and the network address of the second neighboring network node or between the second path label and the network link between the network node and the second neighboring network node;

store the second association at the network node;

transmit the path probe reply packet to the first neighboring network node;

determine that a data packet is associated with the first path label; and transmit the data packet to the first neighboring network node based on the information stored at the network node that indicates that the first neighboring network node or the network link between the network node and the first neighboring network node forms the part of the first network path identified by the first path label.

11. The network node of claim 10, wherein the first neighboring network node is a destination node of the first network path.

12. The network node of claim 10, wherein the first neighboring network node is an intermediate node of the first network path.

13. The network node of claim 10, wherein the second neighboring network node is a source node of the first network path.

14. The network node of claim 10, wherein the path probe request packet further indicates the network address of the second neighboring network node or the network link between the network node and the second neighboring network node, and the one or more processors are further configured to:
   establish a third association between the first path label and the network address of the second neighboring network node or between the first path label and the network link between the network node and the second neighboring network node; and store the third association at the network node.

15. The network node of claim 10, wherein the path probe request packet is generated by an end node of the first network path based on information provided by an orchestrator.

16. The network node of claim 15, wherein the information provided by the orchestrator indicates at least one of the network address of the first neighboring network node or the network link between the network node and the first neighboring network node, the information provided by the orchestrator further including the first path label.

17. The network node of claim 10, wherein the first network path forms a part of a network that overlays an internet protocol (IP) based public network.

18. The network node of claim 10, wherein the one or more processors are further configured to receive an indication that the first network path has been established, wherein the data packet is transmitted in response to receiving the indication that the first network path has been established and wherein the data packet includes a data payload and the first path label associated with the first network path.

* * * * *